United States Patent
O'Connor et al.

(10) Patent No.: US 9,346,167 B2
(45) Date of Patent: *May 24, 2016

(54) TRAINABLE CONVOLUTIONAL NETWORK APPARATUS AND METHODS FOR OPERATING A ROBOTIC VEHICLE

(71) Applicant: Brain Corporation, San Diego, CA (US)

(72) Inventors: Peter O'Connor, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,113

(22) Filed: Apr. 29, 2014

(65) Prior Publication Data

US 2015/0306761 A1    Oct. 29, 2015

(51) Int. Cl.
| | |
|---|---|
| *G05B 19/04* | (2006.01) |
| *G05B 19/18* | (2006.01) |
| *B25J 9/16* | (2006.01) |
| *G06N 3/00* | (2006.01) |

(Continued)

(52) U.S. Cl.
CPC ........ *B25J 9/1697* (2013.01); *B25J 9/16* (2013.01); *G06N 3/008* (2013.01); *G06N 3/049* (2013.01); *G06N 3/084* (2013.01); *Y10S 901/01* (2013.01); *Y10S 901/47* (2013.01)

(58) Field of Classification Search
USPC ................... 700/250, 245, 236; 901/3, 9, 1, 8
See application file for complete search history.

(56) References Cited

U.S. PATENT DOCUMENTS

| | | |
|---|---|---|
| 3,920,972 A | 11/1975 | Corwin, Jr. et al. |
| 4,468,617 A | 8/1984 | Ringwall |
| 4,617,502 A | 10/1986 | Sakaue et al. |

(Continued)

FOREIGN PATENT DOCUMENTS

| | | |
|---|---|---|
| CN | 102226740 A | 10/2011 |
| EP | 2384863 A2 | 11/2011 |

(Continued)

OTHER PUBLICATIONS

<a    href="http://www.braincorporation.com/specs/BStem_SpecSheet_Rev_Nov11_2013.pdf">http://www.braincorporation.com/specs/BStem_SpecSheet_Rev_Nov11_2013.pdf<a>.

(Continued)

*Primary Examiner* — Ronnie Mancho

(74) *Attorney, Agent, or Firm* — Gazdzinski & Associates, PC

(57) ABSTRACT

A robotic vehicle may be operated by a learning controller comprising a trainable convolutional network configured to determine control signal based on sensory input. An input network layer may be configured to transfer sensory input into a hidden layer data using a filter convolution operation. Input layer may be configured to transfer sensory input into hidden layer data using a filter convolution. Output layer may convert hidden layer data to a predicted output using data segmentation and a fully connected array of efficacies. During training, efficacy of network connections may be adapted using a measure determined based on a target output provided by a trainer and an output predicted by the network. A combination of the predicted and the target output may be provided to the vehicle to execute a task. The network adaptation may be configured using an error back propagation method. The network may comprise an input reconstruction.

22 Claims, 10 Drawing Sheets

(51) Int. Cl.
*G06N 3/04* (2006.01)
*G06N 3/08* (2006.01)

(56) References Cited

U.S. PATENT DOCUMENTS

| | | |
|---|---|---|
| 4,638,445 A | 1/1987 | Mattaboni |
| 4,706,204 A | 11/1987 | Hattori |
| 4,763,276 A | 8/1988 | Perreirra et al. |
| 4,852,018 A | 7/1989 | Grossberg et al. |
| 5,063,603 A | 11/1991 | Burt |
| 5,092,343 A | 3/1992 | Spitzer et al. |
| 5,121,497 A | 6/1992 | Kerr et al. |
| 5,245,672 A | 9/1993 | Wilson et al. |
| 5,303,384 A | 4/1994 | Rodriguez et al. |
| 5,355,435 A | 10/1994 | Deyong et al. |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,638,359 A | 6/1997 | Peltola et al. |
| 5,673,367 A | 9/1997 | Buckley |
| 5,687,294 A | 11/1997 | Jeong |
| 5,719,480 A | 2/1998 | Bock et al. |
| 5,739,811 A | 4/1998 | Rosenberg et al. |
| 5,841,959 A | 11/1998 | Guiremand |
| 5,875,108 A | 2/1999 | Hoffberg et al. |
| 5,994,864 A | 11/1999 | Inoue et al. |
| 6,009,418 A | 12/1999 | Cooper |
| 6,014,653 A | 1/2000 | Thaler |
| 6,218,802 B1 | 4/2001 | Onoue et al. |
| 6,259,988 B1 | 7/2001 | Galkowski et al. |
| 6,272,479 B1 | 8/2001 | Farry et al. |
| 6,363,369 B1 | 3/2002 | Liaw et al. |
| 6,366,293 B1 | 4/2002 | Hamilton et al. |
| 6,442,451 B1 | 8/2002 | Lapham |
| 6,458,157 B1 | 10/2002 | Suaning |
| 6,489,741 B1 | 12/2002 | Genov et al. |
| 6,493,686 B1 | 12/2002 | Francone et al. |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,601,049 B1 | 7/2003 | Cooper |
| 6,636,781 B1 | 10/2003 | Shen et al. |
| 6,643,627 B2 | 11/2003 | Liaw et al. |
| 6,697,711 B2 | 2/2004 | Yokono et al. |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe et al. |
| 7,024,276 B2 | 4/2006 | Ito |
| 7,324,870 B2 | 1/2008 | Lee |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,426,920 B1 | 9/2008 | Petersen |
| 7,668,605 B2 | 2/2010 | Braun et al. |
| 7,672,920 B2 | 3/2010 | Ito et al. |
| 7,752,544 B2 | 7/2010 | Cheng et al. |
| 7,849,030 B2 | 12/2010 | Ellingsworth |
| 8,015,130 B2 | 9/2011 | Matsugu et al. |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre et al. |
| 8,380,652 B1 | 2/2013 | Francis, Jr. |
| 8,419,804 B2 | 4/2013 | Herr et al. |
| 8,452,448 B2 | 5/2013 | Pack et al. |
| 8,467,623 B2 | 6/2013 | Izhikevich et al. |
| 8,509,951 B2 | 8/2013 | Gienger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee et al. |
| 8,793,205 B1 | 7/2014 | Fisher et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 * | 4/2015 | Ponulak et al. ............ 700/250 |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,186,793 B1 | 11/2015 | Meier |
| 9,189,730 B1 | 11/2015 | Coenen et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters |
| 2002/0175894 A1 | 11/2002 | Grillo |
| 2002/0198854 A1 | 12/2002 | Berenji et al. |
| 2003/0023347 A1 | 1/2003 | Konno et al. |
| 2003/0050903 A1 | 3/2003 | Liaw et al. |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta et al. |
| 2004/0128028 A1 | 7/2004 | Miyamoto et al. |
| 2004/0131998 A1 | 7/2004 | Marom et al. |
| 2004/0136439 A1 | 7/2004 | Dewberry et al. |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan et al. |
| 2004/0267404 A1 | 12/2004 | Danko |
| 2005/0004710 A1 | 1/2005 | Shimomura et al. |
| 2005/0015351 A1 | 1/2005 | Nugent |
| 2005/0036649 A1 | 2/2005 | Yokono et al. |
| 2005/0049749 A1 | 3/2005 | Watanabe et al. |
| 2005/0065651 A1 | 3/2005 | Ayers et al. |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu et al. |
| 2006/0069448 A1 | 3/2006 | Yasui |
| 2006/0082340 A1 | 4/2006 | Watanabe et al. |
| 2006/0094001 A1 | 5/2006 | Torre et al. |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh |
| 2006/0189900 A1 | 8/2006 | Flaherty et al. |
| 2006/0207419 A1 | 9/2006 | Okazaki et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock et al. |
| 2008/0024345 A1 | 1/2008 | Watson |
| 2008/0040040 A1 | 2/2008 | Goto et al. |
| 2008/0097644 A1 | 4/2008 | Kaznov et al. |
| 2008/0100482 A1 | 5/2008 | Lazar |
| 2008/0112596 A1 | 5/2008 | Rhoads et al. |
| 2008/0133052 A1 | 6/2008 | Jones et al. |
| 2008/0140257 A1 | 6/2008 | Sato et al. |

(56) References Cited

U.S. PATENT DOCUMENTS

| | | |
|---|---|---|
| 2008/0154428 A1 | 6/2008 | Nagatsuka et al. |
| 2008/0162391 A1 | 7/2008 | Izhikevich |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0234501 A1 | 9/2009 | Ishizaki |
| 2009/0272585 A1 | 11/2009 | Nagasaka |
| 2009/0287624 A1 | 11/2009 | Rouat et al. |
| 2009/0299751 A1 | 12/2009 | Jung |
| 2009/0312817 A1 | 12/2009 | Hogle et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0119214 A1 | 5/2010 | Shimazaki et al. |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger et al. |
| 2010/0225824 A1 | 9/2010 | Lazar et al. |
| 2010/0286824 A1 | 11/2010 | Solomon |
| 2010/0292835 A1 | 11/2010 | Sugiura et al. |
| 2010/0299101 A1 | 11/2010 | Shimada et al. |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen et al. |
| 2011/0026770 A1 | 2/2011 | Brookshire |
| 2011/0035052 A1 | 2/2011 | McLurkin et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch et al. |
| 2011/0119215 A1 | 5/2011 | Elmegreen et al. |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0196199 A1 | 8/2011 | Donhowe et al. |
| 2011/0208350 A1 | 8/2011 | Eliuk et al. |
| 2011/0231016 A1 | 9/2011 | Goulding |
| 2011/0296944 A1 | 12/2011 | Carter et al. |
| 2011/0319714 A1 | 12/2011 | Roelle et al. |
| 2012/0011090 A1 | 1/2012 | Tang et al. |
| 2012/0011093 A1 | 1/2012 | Aparin et al. |
| 2012/0036099 A1 | 2/2012 | Venkatraman et al. |
| 2012/0045068 A1 | 2/2012 | Kim et al. |
| 2012/0053728 A1 | 3/2012 | Theodorus et al. |
| 2012/0109866 A1 | 5/2012 | Modha |
| 2012/0143495 A1 | 6/2012 | Dantu |
| 2012/0150781 A1 | 6/2012 | Arthur et al. |
| 2012/0173021 A1 | 7/2012 | Tsusaka |
| 2012/0185092 A1 | 7/2012 | Ku |
| 2012/0197439 A1 | 8/2012 | Wang et al. |
| 2012/0209428 A1 | 8/2012 | Mizutani |
| 2012/0209432 A1 | 8/2012 | Fleischer et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski et al. |
| 2012/0308136 A1 | 12/2012 | Izhikevich |
| 2013/0019325 A1 | 1/2013 | Deisseroth et al. |
| 2013/0066468 A1 | 3/2013 | Choi et al. |
| 2013/0073080 A1 | 3/2013 | Ponulak |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0096719 A1 | 4/2013 | Sanders et al. |
| 2013/0116827 A1 | 5/2013 | Inazumi |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0218821 A1 | 8/2013 | Szatmary et al. |
| 2013/0251278 A1 | 9/2013 | Izhikevich et al. |
| 2013/0297541 A1 | 11/2013 | Piekniewski et al. |
| 2013/0297542 A1 | 11/2013 | Piekniewski et al. |
| 2013/0310979 A1 | 11/2013 | Herr et al. |
| 2013/0325244 A1 | 12/2013 | Wang et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0345718 A1 | 12/2013 | Crawford et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen et al. |
| 2014/0089232 A1 | 3/2014 | Buibas et al. |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich et al. |
| 2014/0277744 A1 | 9/2014 | Coenen |
| 2014/0309659 A1 | 10/2014 | Roh et al. |
| 2014/0358284 A1 | 12/2014 | Laurent et al. |
| 2014/0369558 A1 | 12/2014 | Holz |
| 2014/0371907 A1* | 12/2014 | Passot et al. ............... 700/257 |
| 2014/0371912 A1* | 12/2014 | Passot et al. ............... 700/264 |
| 2015/0032258 A1 | 1/2015 | Passot et al. |
| 2015/0094850 A1* | 4/2015 | Passot et al. ............... 700/245 |
| 2015/0094852 A1* | 4/2015 | Laurent et al. ............. 700/250 |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |

FOREIGN PATENT DOCUMENTS

| | | |
|---|---|---|
| JP | H0487423 A | 3/1992 |
| JP | 2003175480 A | 6/2003 |
| RU | 2108612 C1 | 4/1998 |
| WO | WO-2008083335 A2 | 7/2008 |
| WO | WO-2010136961 A1 | 12/2010 |
| WO | WO-2011039542 A1 | 4/2011 |
| WO | WO-2012151585 A2 | 11/2012 |

OTHER PUBLICATIONS

A Neural Network for Ego-motion Estimation from Optical Flow, by Branka, Published 1995.

Abbott L. F. and Nelson S.B. (2000), "Synaptic plasticity: taming the beast", Nature Neuroscience, 3, 1178-1183.

Alexandros <ltg class="gr_gr_3 gr-alert gr_spell ContextualSpelling ins-del multiReplace" id="3" data-gr-id="3">Bouganis</g> and Murray Shanahan, "Training a Spiking Neural Network to Control a 4-DoF Robotic Arm based on Spike

(56) References Cited

OTHER PUBLICATIONS

Timing-Dependent Plasticity", Proceedings of WCCI 2010 IEEE World Congress on Computational Intelligence, COB, Barcelona, Spain, Jul. 18-23, 2010, pp. 4104-4111.
Alvarez, "Review of Approximation Techniques," PhD thesis, chapter 2, pp. 7-14, University of Bradford, 2000.
Asesio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:<http://msc.berkeley.edu/wjchen/publications/DSC12.sub.--8726.sub.--FI-.pdf>.
Bartlett et al., "Convexity, Classification, and Risk Bounds" Jun. 16, 2005, pp. 1-61.
Bartlett., et al., "Large Margin Classifiers: Convex Loss, Low Noise, and Convergence Rates," Dec. 8, 2003, 8 pgs.
Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs ,cwi ,n11- sbolltedmblicabond)hdthesislxif>.
Brette et al., Brian: a simple and flexible simulator for spiking neural networks, The Neuromorphic Engineer, Jul. 1, 2009, pp. 1-4, doi: 10.2417/1200906.1659.
Cessac et al. 'Overview of facts and issues about neural coding by spikes.' Journal of Physiology, Paris 104.1 (2010): 5.
Chung Hyuk Park., et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Mar. 12, 2015]. Retrieved from the Internet<URL:https://smartech.gatech.edu!bitstream/handle/1853/38279/IEEE_2010_ICRA_0 02.pdf>.
Computation of Optical Flow Using a Neural Network, by Zhou, Published 1988.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. 'Probability distributions of the logarithm of inter-spike intervals yield accurate entropy estimates from small datasets.' Journal of neuroscience methods 173.1 (2008): 129.
Fall Detection Using Modular Neural Networks with Back-projected Optical Flow, by Huang, Published 2007.
Fidjeland, et al., "Accelerated Simulation of Spiking Neural Networks Using GPUs," WCCI 2010 IEEE World Congress on Computational Intelligence, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.
Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.
Gewaltig et al.. 'NEST (Neural Simulation Tool)', Scholarpedia, 2007. pp. l-15. 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.
Grollman., et al., "Dogged Learning for Robots," IEEE International Conference on Robotics and Automation (ICRA), 2007.
Izhikevich E.M. (2006) Polychronization: Computation With Spikes. Neural Computation, 18:245-282.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence.
Karbowski et al., 'Multispikes and Synchronization in a Large Neural Network with Temporal Delays', Neural Computation 12. 1573-1606 (2000).
Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from Internet:<http://ncs.ethz.ch/projects/evospike/publications/evolving-spiking-ne-ural-networks-for-spatio-and-spectro-temporal-pattern-recognition-plenary-- talk-ieee-is>.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL:http://www-ee.uta.edu/eeweb/IP/Courses/SPR/Reference/ Khotanzad.pdf.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet: <URL'https://code.google.com/p/ nnql/issues/detail?id=1>.
Lazar et a]. 'Multichannel time encoding with integrate-and-fire neurons.' Neurocomputing 65 (2005): 401-407.
Lazar et al. 'A video time encoding machine', in Proceedings of the 15th IEEE International Conference on Image Processing (ICIP '08 2008, pp. 717-720.
Lazar., et al., "Consistent recovery of sensory stimuli encoded with MIMO neural circuits," Computational intelligence and neuroscience, 2009.
Lazar et al. 'Consistent recovery of sensory stimuli encoded with MIMO neural circuits.' Computational intelligence and neuroscience (2010): 2.
Makridakis et al., "Evaluating Accuracy (or Error) Measures", INSTEAD Technical Report, 1995/18/TM.
Masquelier, Timothee, 'Relative spike time coding and STOP-based orientation selectivity in the early visual system in natural continuous and saccadic vision: a computational model.' Journal of computational neuroscience 32.3 (2012): 425-441.
Miller III, "Real-Time Application of Neural Networks for Sensor-Based Control of Robots with Vision," IEEE Transactions on Systems, Man, and Cypernetics Jul. /Aug. 1989, vol. 19 (4), pp. 825-831.
Nguyen et al., "Estimating divergence functionals and the likelihood ratio by penalized convex risk minimization" 2007, pp. 1-8.
Nichols, A Re configurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

(56) References Cited

OTHER PUBLICATIONS

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu! viewdoc/download?doi=0.1.1.5.4346&rep—repl&type-pdf.

Sato et al., 'Pulse interval and width modulation for video transmission.' Cable Television, IEEE Transactions on 4 (1978): 165-173.

Schemmel, J., Grub!, A., Meier, K., Mueller, E.: Implementing synaptic plasticity in a VLSI spiking neural network model. In: Proceedings of the 2006 International Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg. deNeroeffentlichungen/download. cgi/4620/ps/1774.pdf Introduction.

Simulink.RTM. model [online], [Retrieved on Dec. 10, 2013] Retrieved from <URL:http://www.mathworks.com/ products/ simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Specification, figures and EFS receipt of U.S. Appl. No. 14/244,888, filed Apr. 3, 2014 and entitled "Learning apparatus and methods for control of robotic devices via spoofing" (100 pages).

Specification, figures and EFS receipt of U.S. Appl. No. 14/244,890, tiled Apr. 3, 2014 and entitled "Apparatus and methods for remotely controlling robotic devices" (91 pages).

Specification, figures and EFS receipt of U.S. Appl. No. 14/244,892, filed Apr. 3, 2014 and entitled-"Spoofing remote control apparatus and methods" (95 pages).

Specification, figures and EFS receipt of U.S. Appl. No. 14/265,113, filed Apr. 29, 2014 and entitled "Trainable convolutional network apparatus and methods for operating a robotic vehicle" (71 pages).

Specification, figures and EFS receipt of U.S. Appl. No. 14/285,385, filed May 22, 2014 and entitled "Apparatus and methods for real time estimation of differential motion in live video" (42 pages).

Specification, figures and EFS receipt of U.S. Appl. No. 14/285,414, filed May 22, 2014 and entitled "Apparatus and methods for distance estimation using multiple image sensors" (63 pages).

Specification, figures and EFS receipt of U.S. Appl. No. 14/285,466, filed May 22, 2014 and entitled "Apparatus and methods for robotic operation using video imagery" (64 pages).

Specification, figures and EFS receipt of U.S. Appl. No. 14/321,736, filed Jul. 1, 2014 and entitled "Optical detection apparatus and methods" (49 pages).

Specification, figures and EFS receipt of U.S. Appl. No. 14/326,374, filed Jul. 8, 2014 and entitled "Apparatus and methods for distance estimation using stereo imagery" (75 pages).

Specification, figures and EFS receipt of U.S. Appl. No. 14/489,242, filed Sep. 17, 2014 and entitled "Apparatus and methods for remotely controlling robotic devices" (100 pages).

Specification, figures and EFS receipt of U.S. Appl. No. 14/542,391, filed Nov. 14, 2014 and entitled "Feature detection apparatus and methods for training of robotic navigation" (83 pages).

Specification, figures and EFS receipt of U.S. Appl. No. 14/588,168, filed Dec. 31, 2014 and entitled "Apparatus and methods for training robots" (101 pages).

Specification, figures and EFS receipt of U.S. Appl. No. 14/637,138, filed Mar. 3, 2015 and entitled "Salient features tracking apparatus and methods using visual initialization" (66 pages).

Specification, figures and EFS receipt of U.S. Appl. No. 14/637,164, filed Mar. 3, 2015 and entitled "Apparatus and methods for tracking salient features" (66 pages).

Specification, figures and EFS receipt of U.S. Appl. No. 14/637,191, filed Mar. 3, 2015 and entitled "Apparatus and methods for saliency detection based on color occurrence analysis" (66 pages).

Specification, figures and EFS receipt of U.S. Appl. No. 14/705,487, tiled May 6, 2015 and entitled "Persistent predictor apparatus and methods for task switching" (119 pages).

Szatmary et al "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10.1371 %2Fjournal,pcbi.1000879<url:></url:>.

Visual Navigation with a Neural Network, by Hatsopoulos, Published 1991.

Walters, "Implementation of Self-Organizing Neural Networks for Visuo-Motor Control of an Industrial Robot," IEEE Transactions on Neural Networks, vol. 4 (1), Jan. 1993, pp. 86-95.

Wang 'The time dimension for scene analysis.' Neural Networks, IEEE Transactions on 16.6 (2005): 1401-1426.

* cited by examiner

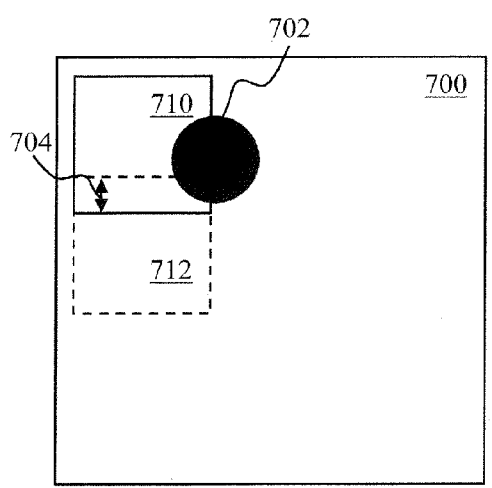
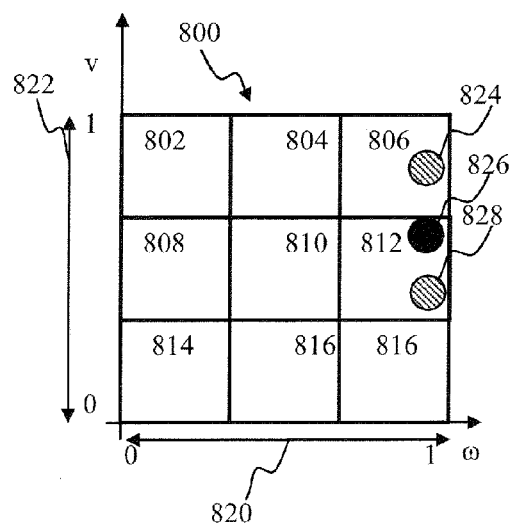
FIG. 7  FIG. 8

TRAINABLE CONVOLUTIONAL NETWORK APPARATUS AND METHODS FOR OPERATING A ROBOTIC VEHICLE

CROSS-REFERENCE TO RELATED APPLICATIONS

This application is related to co-pending and co-owned U.S. patent application Ser. No. 14/244,890 entitled "APPARATUS AND METHODS FOR REMOTELY CONTROLLING ROBOTIC DEVICES", filed Apr. 3, 2014, co-pending and co-owned U.S. patent application Ser. No. 13/918,338 entitled "ROBOTIC TRAINING APPARATUS AND METHODS", filed Jun. 14, 2013, co-pending and co-owned U.S. patent application Ser. No. 13/918,298 entitled "HIERARCHICAL ROBOTIC CONTROLLER APPARATUS AND METHODS", filed Jun. 14, 2013, co-pending and co-owned U.S. patent application Ser. No. 13/907,734 entitled "ADAPTIVE ROBOTIC INTERFACE APPARATUS AND METHODS", filed May 31, 2013, co-pending and co-owned U.S. patent application Ser. No. 13/842,530 entitled "ADAPTIVE PREDICTOR APPARATUS AND METHODS", filed Mar. 15, 2013, co-owned U.S. patent application Ser. No. 13/842,562 entitled "ADAPTIVE PREDICTOR APPARATUS AND METHODS FOR ROBOTIC CONTROL", filed Mar. 15, 2013, co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, co-owned U.S. patent application Ser. No. 13/842,647 entitled "MULTICHANNEL ROBOTIC CONTROLLER APPARATUS AND METHODS", filed Mar. 15, 2013, and co-owned U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to, inter alia, adaptive control and training of robotic devices.

2. Background

Robotic devices are used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Remote control robotic devices may require user attention during the duration of task execution by the robot. Remote control operation typically relies on user experience and/or agility that may be inadequate when dynamics of the control system and/or environment change rapidly (e.g., an unexpected obstacle appears in path of a remotely controlled vehicle).

SUMMARY

One aspect of the disclosure relates to a method of operating a robotic device by a computerized neuron network comprising an input layer, an intermediate layer and an output layer of neurons. In one embodiment, the method includes: during one operation of a plurality of operations causing the robotic device to execute an action along a first trajectory in accordance with a first control signal determined based on a sensory input; determining, by the output layer, a performance measure based on an evaluation of the first trajectory and indication related to a target trajectory provided by a trainer; conveying information related to the performance measure to the input layer; and updating one or more learning parameters of the input layer in accordance with the information. In one embodiment, during a subsequent operation of a plurality of operations: causing the robotic device to execute the action along a second trajectory in accordance with a second control signal determined based on the sensory input; wherein: the execution of the action along the second trajectory is characterized by a second performance measure; and the updating is configured to displace the second trajectory closer towards the target trajectory relative to the first trajectory.

In one variant, the first control signal is based on a feature detected in the sensory input; one or more first nodes of the input layer process are configured to effectuate the detection of the feature; and the updating is configured to modify one or more parameters associated with the one or more first nodes of the input layer. In one such variant, one or more second nodes of the output layer are configured to produce the first control signal; the one or more first nodes of the input layer are coupled to the one or more second nodes of the output layer via a connectivity array of efficacies; and the updating comprises a plasticity operation configured to modify one or more efficacies of the connectivity array of efficacies. Moreover, in some implementations, the one or more first nodes of the input layer are coupled to the one or more second nodes of the output layer via an-all to all connectivity pattern; and the connectivity array of efficacies is characterized by a first dimension determined based on a first number of the one or more first nodes of the input layer and a second dimension determined based on a second number of the one or more second nodes of the output layer.

In another variant, the performance measure comprises a first distance between the first trajectory and the target trajectory; and the second performance measure comprises a second distance between the second trajectory and the target trajectory, the second distance being smaller than the first distance.

In still another variant, the performance measure comprises a first probability parameter between the first trajectory and the target trajectory; and the second performance measure comprises a second probability between the second trajectory and the target trajectory, the second probability being greater than the first probability.

In yet another variant, the computerized neuron network is configured for operation in accordance with a supervised learning process configured based on a teaching signal; and the first control signal comprises a combination of the second layer output and a teaching signal provided to the robotic device.

One aspect of the disclosure relates to a method of generating a predicted control output by an adaptive controller of a robotic apparatus comprising a predictor and a combiner. In one embodiment, the method includes: configuring the adaptive controller apparatus to detect an object in sensory input provided by a sensor of the robotic apparatus, the object detection causing generation of a control output based on a characteristic of the object; configuring the predictor to determine a predicted control output based on the characteristic of the object; configuring the combiner to determine a combined output based on a control input and the predicted control output, the combined output being characterized by a transform function; determining a performance measure based on the predicted control output and the combined output; updating one or more learning parameters of the adaptive controller in accordance with the performance measure; and configuring the adaptive controller to provide the combined output to the robotic apparatus, the combined output configured to cause the robotic apparatus to execute a maneuver in accordance with the characteristic of the object.

In one variant, the object detection is effectuated by a first component of the adaptive controller; the generation of the control output is effectuated by a second component of the adaptive controller; and the one or more learning parameters update is uses a back propagation operation configured to convey the performance measure from the second component to the first component. In one such variant, the control input is provided by a training entity based on an evaluation of a trajectory associated with the maneuver executed by the robotic apparatus versus a target trajectory. In another variant, the transform function is configured to combine the predicted control output and the control input via one or more operations including a union operation. In another such variant, the transform function is configured to combine the predicted control output and the control input via one or more operations including an additive operation. In some cases, the training entity comprises a computerized apparatus operable in accordance with a reinforcement learning process; and the predictor is operable in accordance with a supervised learning process configured based on a teaching signal configured based on the combined output.

In one variant, the robotic apparatus comprises a vehicle; the sensory input comprises a video stream of the vehicle surroundings; the characteristic comprises a representation of an obstacle or a target within the surroundings; and the maneuver comprises one of an obstacle voidance or a target approach.

One aspect of the disclosure relates to a computerized neuron network apparatus configured to provide a response based on analysis of visual input frames. In one embodiment, the apparatus includes: an input component comprising first portion of neurons configured to implement a convolutional operation on the visual input frames using a plurality of filter masks, the operation configured to produce convolved input frames; an output component comprising at least one output neuron configured to provide an output based on the at least one output neuron reaching a target state; a connection component configured to couple the input component to the at least one output neuron via an efficacy array; and a cost estimation component configured to determine a first similarity measure between a response and a target response. In one such embodiment, the response is configured based on the output; the first similarity measure determined based on a first analysis of a first frame of the visual input frames is configured to cause update of the neuron network, the update of the neuron network configured to increase a second similarity measure determined based on a second analysis of a second frame of the visual input frames subsequent to the first frame.

In one variant, the update comprises: determination of a discrepancy parameter based on the first similarity measure; modification of one or more efficacies of the efficacy array using the discrepancy parameter; backward propagation of the discrepancy parameter from the output component to the input component using a gradient operation with respect to a filter parameter; and modification of the filter mask parameter based on an outcome of the gradient operation. In one case, the apparatus includes an input reconstruction component configured to produce reconstructed input frames based on the convolved input frames and a de-convolution filter mask; wherein the update further comprises: a second modification of the filter mask parameter based on an evaluation of the input frame and a first reconstructed input frame, the second modification configured to reduce the discrepancy for another response generated based on a third frame subsequent to the second frame. In one such variant, a first response generated in an absence of input reconstruction is characterized by a first value of the second similarity measure a second response generated based on the input reconstruction is characterized by a second value of the second similarity measure, the second value being greater than the first value.

In one variant, the apparatus is configured to determine that the response is closer to the target response based at least on the second value being greater than the first value.

In another variant, the apparatus includes a combiner component configured to determine the response based at least on the output and a correction signal, the combined output being characterized by a transform function; wherein the determination of the first similarity measure is configured based on the output and the combined output.

In still other variants, the convolved frame is configured to enable detection of an object; the output is configured based on the detected object; the response is configured to be provided to the robotic apparatus, the response being configured to cause the robotic apparatus to execute a first action in accordance with the detected object.

In another variant, the first action is selected from the group comprising object avoidance actions and object approach actions.

One aspect of the disclosure relates to a method of operating a robotic device using a computerized neuron network having a plurality of layers of neurons. In one embodiment, the method includes: causing the robotic device to execute an action along a first trajectory in accordance with a first control signal, the first signal determined based at least on a sensory input; determining a performance measure based on an evaluation of the first trajectory relative to a target trajectory; updating one or more learning parameters of a first of the plurality of layers in accordance with information relating to the determined performance measure; and causing the robotic device to execute the action along a second trajectory in accordance with a second control signal, the second signal determined based at least on a sensory input and the updated one or more learning parameters, the second trajectory being closer to the target trajectory than the first trajectory.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 7 is a block diagram illustrating convolution of a filter mask with a frame of pixels, in accordance with one or more implementations.

FIG. 8 is a graphical representation of a control state space transformation that may be employed by a controller apparatus, in accordance with one or more implementations.

Figure 1:
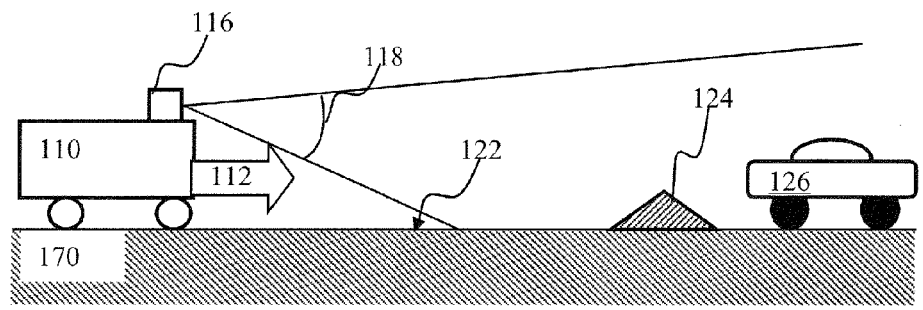
FIG. 1 is a graphical illustration depicting a robotic vehicle comprising an adaptive controller apparatus configured for obstacle avoidance, in accordance with one or more implementations.

All Figures disclosed herein are © Copyright 2014 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of, or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same components, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example, a standard "bus", hierarchical bus, network-on-chip, address-event-representation (AER) connection, and/or other type of communication topology used for accessing, e.g., different memories in a pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", and "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), complex instruction set computers (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2.0, USB3.0, USB3.1), Ethernet (e.g., 10/100, 10/100/1000 (Gigabit Ethernet), 10-Gig-E, etc.), MoCA, Coaxsys (e.g., TVnet™), radio frequency tuner (e.g., in-band or out-of-band (OOB), cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), and/or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Exemplary System

Figure 4:
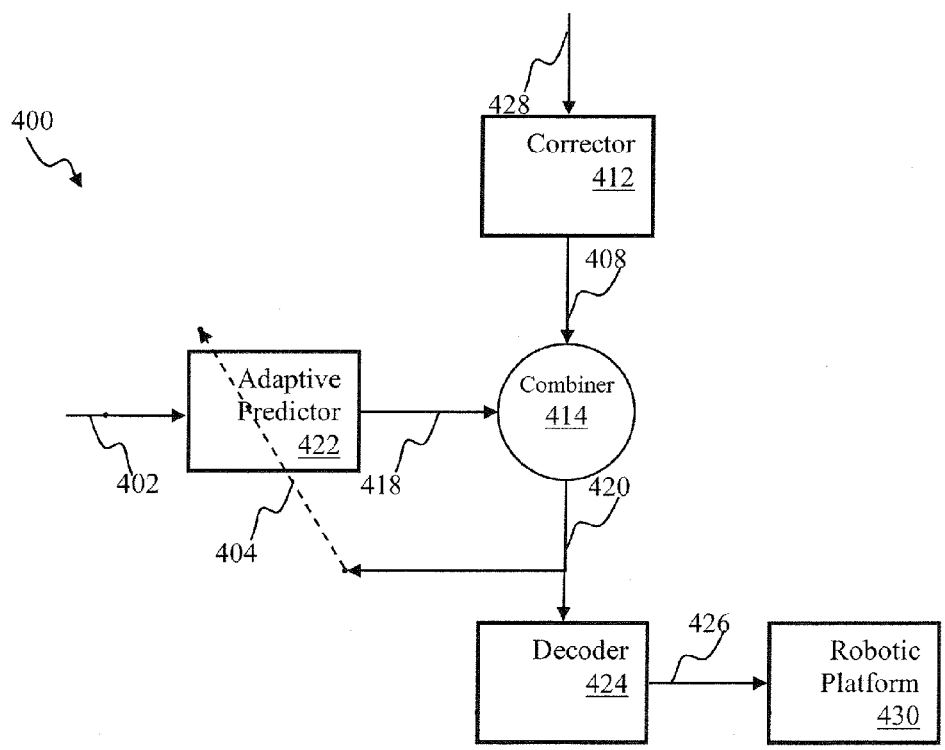
FIG. 4 is a block diagram illustrating an adaptive predictor apparatus for use with, e.g., the learning apparatus of FIG. 2, according to one or more implementations.
Figure 5A:
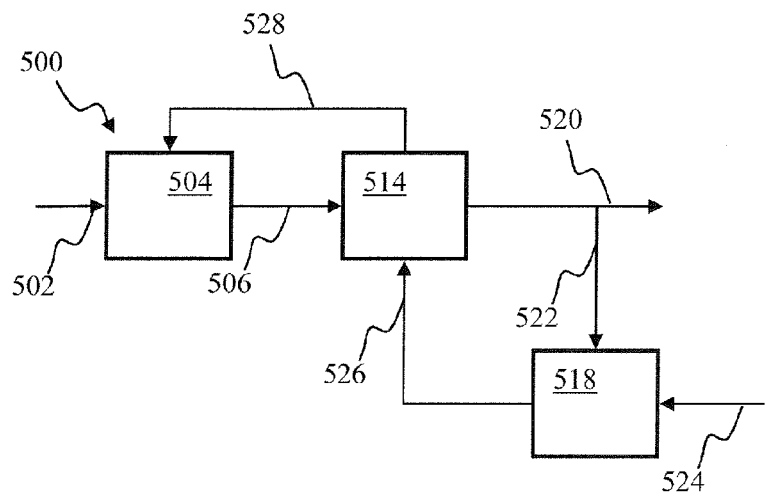
FIG. 5A is a functional block diagram illustrating a robotic controller comprising a trainable convolutional network apparatus, in accordance with one implementation.
Figure 5B:
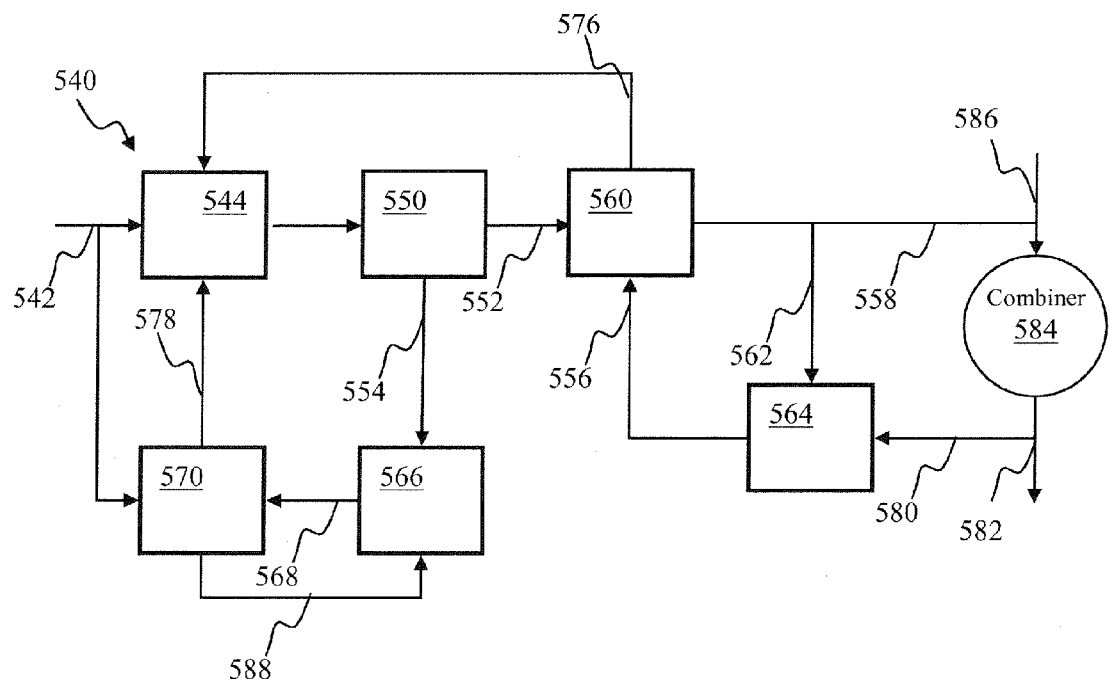
FIG. 5B is a functional block diagram illustrating a trainable convolutional network apparatus comprising an unsupervised learning component, in accordance with one implementation.

FIG. 1 depicts a mobile robotic apparatus that may be configured with an adaptive controller in accordance with one or more implementations of e.g., the learning apparatuses illustrated in FIGS. 4-5B, infra. The robotic apparatus 110 may comprise a sensor component 116. The sensor component 116 may be characterized by an aperture/field of view 118 (e.g., an extent of the observable world that may be captured by the sensor at a given moment). The sensor component 116 may provide information associated with objects within the field-of-view 118. In one or more implementations, such as object recognition, and/or obstacle avoidance, the output provided by the sensor component 116 may comprise a stream of pixel values associated with one or more digital images. In one or more implementations of e.g., video, radar, sonography, x-ray, magnetic resonance imaging, and/or other types of sensing, the sensor 116 output may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red/green/blue (RGB) values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS", issued as U.S. Pat. No. 8,467,623 on Jun. 18, 2013; co-owned U.S. patent application Ser. No. 12/869,573, filed Aug. 26, 2010, issued as U.S. Pat. No. 8,315,305 on Nov. 20, 2012, and entitled "SYSTEMS AND METHODS FOR INVARIANT PULSE LATENCY CODING"; co-pending and co-owned U.S. patent application Ser. No. 13/152,084, filed Jun. 2, 2011, and entitled "APPARATUS AND METHODS FOR PULSE-CODE INVARIANT OBJECT RECOGNITION"; and/or latency encoding comprising a temporal winner take all mechanism described in co-owned U.S. patent application Ser. No. 13/757,607, filed Feb. 1, 2013, and entitled "TEMPORAL WINNER TAKES ALL SPIKING NEURON NETWORK SENSORY PROCESSING APPARATUS AND METHODS", issued as U.S. Pat. No. 9,070,039 on Jun. 30, 2015, each of the foregoing being incorporated herein by reference in its entirety.

In one or more implementations, object recognition and/or classification may be implemented using a spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as neuron excitability which is described in co-owned U.S. patent application Ser. No. 13/623,820 entitled "APPARATUS AND METHODS FOR ENCODING OF SENSORY DATA USING ARTIFICIAL SPIKING NEURONS", filed Sep. 20, 2012 and issued as U.S. Pat. No. 9,047,568 on Jun. 2, 2015, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. The term continuous signal may be used to describe a non-spiking signal (e.g., analog, n-ary digital signal characterized by n-bits of resolution, n>1). In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned and co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, each of the foregoing being incorporated herein by reference in its entirety.

In some implementations of robotic navigation in an arbitrary environment, the sensor component 116 may comprise a camera configured to provide an output comprising a plurality of digital image frames refreshed at, e.g., 25 Hz frame rate. The sensor output may be processed by a learning controller, e.g., as illustrated and described with respect to FIG. 2.

Figure 2:
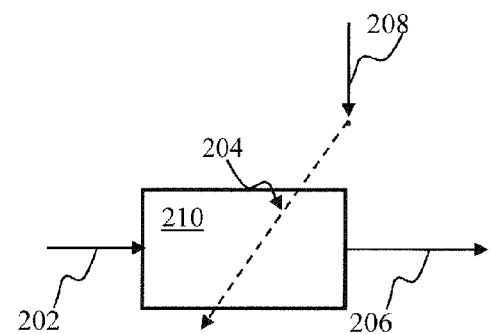
FIG. 2 is a block diagram illustrating a learning apparatus configured to determine a control signal for a robotic device, according to one or more implementations.

The controller 210 of FIG. 2 may receive the output 202 provided by the camera 116 of FIG. 1. The controller 210 of FIG. 2 may operate a learning process configured to produce control output 206. In one or more implementations, the target control signal 208 may comprise input provided by a control entity a user and/or a computerized agent, as described in detail, e.g., in co-owned U.S. patent application Ser. No. 13/842,583 entitled "APPARATUS AND METHODS FOR TRAINING OF ROBOTIC DEVICES", filed Mar. 15, 2013, incorporated by reference supra. The control signal 208 may act as a teaching signal 204 configured to cause adjustment of the controller 210 learning process. The controller 210 output 206 may comprise one or more control commands configured to cause a robotic device (e.g., the rover 110 of FIG. 1) to execute a task, e.g., as illustrated and described with respect to FIGS. 3A-3B.

In some implementations of robotic vehicle navigation, output of the sensor 116 in FIG. 1 may comprise representations of one or more objects (e.g., targets, and/or obstacles). The tasks of the robot may be configured based on a context. In one or more implementations, the context may comprise one or more of robot state (e.g., location or motion information, (position, orientation, speed), platform state or configuration (e.g., manipulator size and/or position), available power and/or other), state of the environment (e.g., object size, location), environmental state (wind, rain), previous state information (e.g., based on historic states of robot motions), and/or other characteristic state information.

Figure 3A:
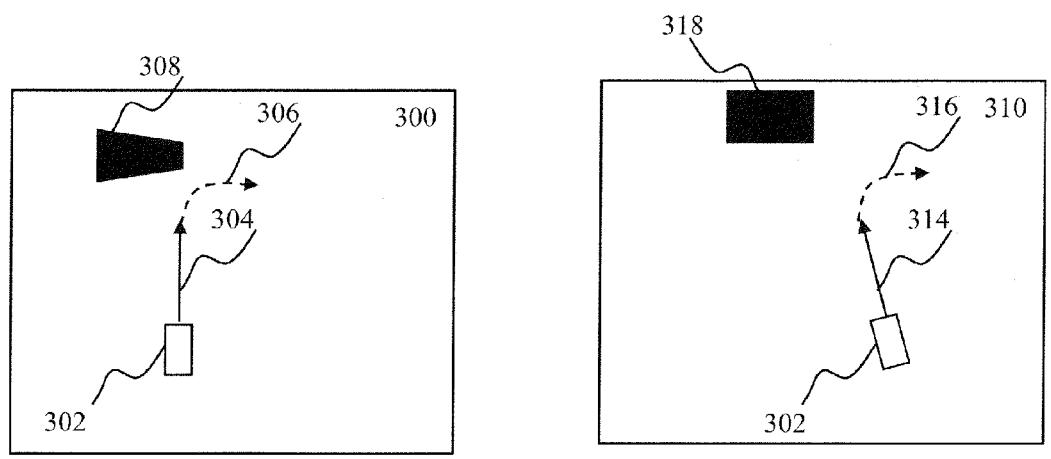
FIG. 3A is a graphical illustration depicting a process for training a robotic device for obstacle avoidance, according to one or more implementations.

For example, the context may correspond to presence, shape, location of an object relative to the robot trajectory as illustrated in FIG. 3A. Panels 300 in FIG. 3A illustrate a sample trajectory 304 of a robotic device 302 during training. The device 302 may comprise for example, a learning controller 210 of FIG. 2. The device 302 controller may be trained to avoid obstacle 308 by, e.g., executing a turn 306. During training the controller of the device 302 may be trained to learn associations between the context (e.g., the object 308 and the trajectory 304 characteristics) and the action (e.g., the turn trajectory denoted by broken line arrow 306 in FIG. 3A). The controller of the device 302 may receive a teaching signal (not shown during the training operation of panel 300). Subsequent to developing the association between occurrence of an obstacle and the turn trajectory 306, the controller of the device 302 may produce a control signal configured to cause the device 302 to execute the turn maneuver during device operation, as illustrated by panel 310 in FIG. 3A. The device 302 in panel 310 may approach the object 318 along the trajectory 314. The controller of the device 302 may determine that the object 318 may comprise an obstacle and cause the device 302 to execute the turn action depicted by broken line arrow 316 in FIG. 3A. It is noteworthy, that although the device 302 approach trajectory 314 may not match exactly the device trajectory 304 occurring during training, and/or the shape and/or location of the obstacle 318 in panel 310 may not match exactly the shape and/or location of the obstacle 308 in panel 300, the training information obtained during the previous training (of panel 300) may enable the controller of the device 302 to cause execution of the turn 316 as shown in panel 310 during device operation subsequent to training.

Figure 3B:
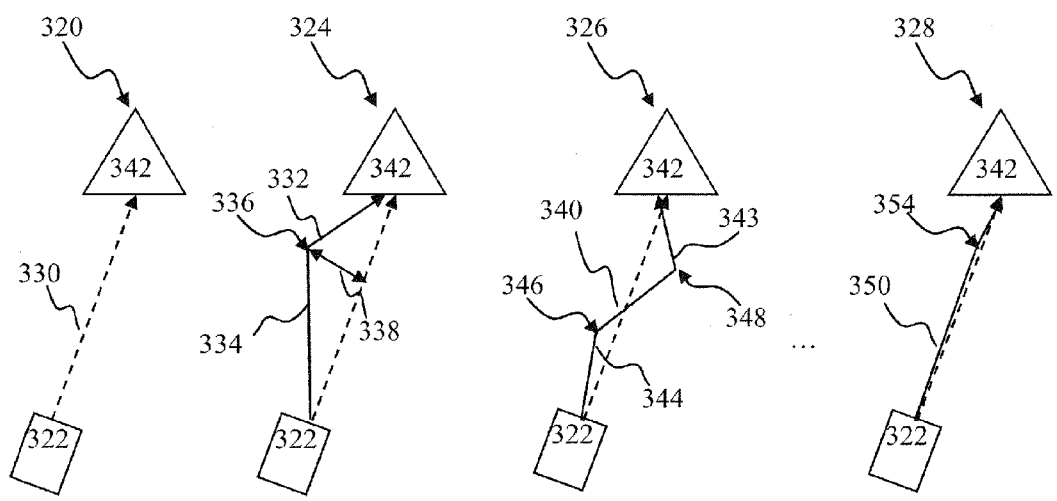
FIG. 3B is a graphical illustration depicting several exemplary trajectories of a robot being trained to perform a target approach task, according to one or more implementations.

Training illustrated and described with respect to FIGS. 3A-3B may be implemented using an online training approach. As used herein, the term "online training" or "training at runtime" may be used to refer to training implementations where training time intervals and operation time intervals overlap and/or coincide with one another. During online learning, a robot navigates a trajectory based on control commands generated by a learning process of the robot. At a given time instance, the robot receives a teaching input, modifies the learning process based on the teaching input, and subsequently navigates the trajectory based on the modified process thus timely incorporating the teaching input. In some implementations, in a given online learning trial, the configuration of the adaptive controller may be adjusted based on teaching input determined during the trial so as to determine controller output for that trial. By way of an illustration, the actions 306, 316 may be executed during a single trial (or a portion thereof) wherein the action 316 may be performed based on an online adjustment of the learning parameters associated with the action 306 execution.

FIG. 3B illustrates training of a robotic rover device to approach a target. The robot 322 in FIG. 3B may be configured to approach the target 342 (e.g., a ball, a charging station, and/or other target). The rover 322 may comprise an adaptive controller, e.g., the control system 400 of FIG. 4. Training may comprise a plurality of trials 320, 324, 326, 328 wherein a teacher may train the adaptive controller of the rover 322 to approach the target 342 along a target trajectory (e.g., depicted by broken line arrow 330). In some implementations, the teacher may comprise a human trainer. During one or more initial trials (e.g., 330 in FIG. 3B) the teacher may direct the robot 322 along the target trajectory 330. In some implementations, the teacher may employ a demonstration using remote operation, using one or more applicable user interfaces. Such interfaces may include one or more of: remote controllers (e.g. joysticks, steering wheels, motion controllers, and/or other devices), voice commands (e.g., go forward, turn left or right, and/or other voice commands), a gesture recognition system (e.g. Kinect®), and/or other interfaces.

In one or more implementations, the teacher perform the demonstration with so-called kinesthetic teaching, where the robot is physically guided (e.g., 'dragged') through the trajectory by the teacher. In this approach, the adaptive controller learning process may comprise an inverse model of the robotic platform. The adaptive controller may be configured to translate the changes in the observed robot sensory space to the motor actions that would result in the same sensory space.

In one or more implementations, the robot may employ learning by mimicking methodology. The robot may be configured to observe a demonstrator performing the desired task, and synthesize the motor actions that would result in performance of the same task on its own.

While following a target trajectory, a processor executing a learning process of the robot controller may learn (e.g., via adaptation of learning parameters) an interrelationship between the sensory input, the controller state, and/or the teaching input. In the exemplary training processes illustrated in FIG. 3B, the sensory input may comprise data related to robot motion and/or location parameters (position, orientation, speed, acceleration and/or other parameters) and/or target information (video camera output, distance to, color, shape, and/or other information). The teaching input may comprise a motion directive (e.g., the joystick being pushed "forward", "right", "left", etc.), motor control commands (e.g., rotate left wheel clockwise and/or other commands) and/or other teaching input. In some implementations, during the teacher-guided trials (e.g., 320), the motor control output (e.g., 420 in FIG. 4 discussed infra) may be configured solely on the control input from the teacher, such as for example in accordance with Eqn. 4 below.

Upon completion of one or more teacher-guided trials (e.g., first trial 320 of FIG. 3B), the robot 322 may be configured to perform one or more teacher-assisted trials (e.g., subsequent trials 324, 326, 328 in FIG. 3B). During a teacher-assisted trial the adaptive controller of the robot 322 may be configured to generate a predicted control signal (e.g., 418 FIG. 4). The predicted control signal may be combined with the teacher's user input using any of the methodologies described herein and/or other methodologies. During the trial 324, the robot may progress along the trajectory portion 334. In some implementations, the teacher may withdraw his guidance during the traversal of the trajectory portion 334 so as to assess an ability of the robot to navigate the target trajectory. In some cases the trajectory portion 634 may deviate from the target trajectory 330. Upon determining that the trajectory deviation (denoted by the arrow 338) exceeds a maximum deviation for the task, the teacher may assist the robot controller's learning process by providing user input. In some implementations, the user input may be configured to assist the robot by providing a correction (e.g., turn right by 110°, indicted by the arrow 336). In one or more implementations, the user input may comprise reward/penalty signals to the robot. The reward/penalty signal may be based on the robot entering given states (e.g., reward for robot orienting itself towards the target, penalty for orienting away from the target); and/or taking certain actions during trajectory traversal. In some implementations, the user input may comprise a warning and/or a correction signal (e.g., joystick input, an uttered phrase e.g., "more to the right", etc.)

In some cases, the teacher may "start over" by using a reset signal configured to reset to a base state configuration of the learning process. In some implementations, reset may be used to reset neuron states and/or connection weights of a predictor when the predictor generates predicted signals that are inconsistent with the target action (e.g., guides the robot away from a target in target approach task, guides the robot in a circuitous route, results in undesirable behaviors, etc.)

In some implementations, the learning process may be configured to store intermediate learning stages corresponding to one or more portions of the trajectory traversal. By way of illustration, the trajectory portions 344, 340 in FIG. 3B may be stored as individual learning stages (partitions) based on an occurrence of a tag signal. The tag signal may be received from the teacher and/or generated internally by the controller based on one or more criteria (e.g., rate of change of motion, distance from target, performance measure and/or other measure). A reset signal may be utilized to reset (clear) learning data associated with the individual portions; for example, portion 340 may be reset, while portions 343 and 344 remain intact. In some implementations, the adaptive controller may be configured to store its state at the time of the tag signal. Upon receiving a reset signal at a subsequent time, the controller may be configured to revert to learning data prior to the tag (i.e., resetting learning data subsequent to the tag).

During the one or more teacher-assisted trials 324, 326, 328 teaching input may be provided one or more times, as illustrated by arrows 336, 346, 348 in FIG. 3B. While following a trajectory during the one or more teacher-assisted trials 324, 326, 328, a learning process of the robot controller may learn an interrelationship between the sensory input (e.g., via adaptation of learning parameters), the controller state (e.g., predicted control signal), and/or the teaching input.

During the successive one or more teacher-assisted trials 324, 326, 328 the performance of the robot may improve as determined based on a performance measure. In some implementations, the performance measure may comprise a discrepancy measure between the actual robot trajectory (e.g., 332, 334, 344, 340, 343) and the target trajectory (e.g., 330). The discrepancy measure may comprise one or more statistics including without limitation: a maximum deviation, a maximum absolute deviation, an average absolute deviation, a mean absolute deviation, a mean difference, a root mean squatter error, a cumulative deviation, and/or other measures.

Upon completion of one or more teacher-assisted trials (e.g., 324, 326, 328), the robot 322 may be configured to navigate the target trajectory absent user input (not shown in FIG. 3B). The learning by the robot during previous trials may enable navigation of the target trajectory by the robot that is within the training performance margin. It is noteworthy that, during teacher-assisted training trials, the user and the robot may cooperate with one another (e.g., via the use of the combiner 414 of FIG. 4) in order to accomplish a target action (e.g., navigate the trajectory 330 of FIG. 3B). In some implementations, the trained behavior (e.g., a target trajectory) may comprise a generalized trait (e.g., avoid obstacles; stay on a surface, and/or other). A path of the robot associated with such behavior may be referred to as the target trajectory (that may be one of many attainable trajectories that may comply with the task cost function).

Various methodologies may be utilized in order to develop associations between sensory context and robot actions (caused by user remote control commands) configured to produce a control signal.

FIG. 4 illustrates an implementation of adaptive control system 400. The adaptive control system 400 of FIG. 4 may comprise a corrector 412, an adaptive predictor 422, and a combiner 414 cooperating to control a robotic platform 430. The learning process of the adaptive predictor 422 may comprise a supervised learning process, a reinforcement learning process, and/or a combination thereof. The corrector 412, the predictor 422 and the combiner 414 may cooperate to produce a control signal 420 for the robotic platform 410. In one or more implementations, the control signal 420 may comprise one or more motor commands (e.g., pan camera to the right, turn right wheel forward), sensor acquisition commands (e.g., use high resolution camera mode), and/or other commands.

In some implementations, the predictor 422 and the combiner 414 components may be configured to operate a plurality of robotic platforms. The control signal 420 may be adapted by a decoder component 424 in accordance with a specific implementation of a given platform 430. In one or more implementations of robotic vehicle control, the adaptation by the decoder 424 may comprise translating binary signal representation 420 into one or more formats (e.g., pulse code modulation) that may be utilized by given robotic vehicle. Co-owned and co-pending U.S. patent application Ser. No. 14/244,890 entitled "APPARATUS AND METHODS FOR REMOTELY CONTROLLING ROBOTIC DEVICES", filed Apr. 3, 2014, incorporated supra, describes some implementations of control signal conversion.

In some implementations of the decoder 424 corresponding to the analog control and/or analog corrector 412 implementations, the decoder may be further configured to rescale the drive and/or steering signals to a range appropriate for the motors and/or actuators of the platform 430.

In some implementations of the discrete state space control implementation of the corrector 412, the decoder 424 may be configured to convert an integer control index into a corresponding steering/drive command using, e.g. a look up table. FIG. 8 illustrates control state space transformation that may be employed by a controller apparatus, e.g., described with respect to FIGS. 4-5B. In some implementations of robotic vehicle navigation (e.g., 430 in FIG. 4) a control state space 800 shown in FIG. 8 may be characterized by a drive component (e.g., linear velocity v) and a turn component (e.g., angular velocity ω). As shown, the component values (v,ω) that may be applied to motors of the vehicle 430 are selected from a range between 0 and 1, shown by arrows 822, 820, respectively in FIG. 8. In some implementations, the predictor 422 may be configured to operate using one or more discrete states. A mapping may be employed in order to transfer control commands from a platform space (e.g., continuous range 822, 820) into discrete states. Rectangular areas 802, 804, 806, 808, 810, 812, 814, 816 in FIG. 8 denote individual discrete states that correspond to the following actions listed in Table 1:

TABLE 1

| V value | ω value | Action | FIG. 8 designator |
|---------|---------|--------|-------------------|
| [⅔ ÷ 1] | [0 ÷ ⅓] | FORWARD-LEFT | 802 |
| [⅔ ÷ 1] | [⅓ ÷ ⅔] | FORWARD | 804 |
| [⅔ ÷ 1] | [⅔ ÷ 1] | FORWARD RIGHT | 806 |
| [⅓ ÷ ⅔] | [0 ÷ ⅓] | LEFT | 808 |
| [⅓ ÷ ⅔] | [⅓ ÷ ⅔] | STILL | 810 |
| [⅓ ÷ ⅔] | [⅔ ÷ 1] | RIGHT | 812 |
| [0 ÷ ⅓] | [0 ÷ ⅓] | BACK-LEFT | 814 |
| [0 ÷ ⅓] | [⅓ ÷ ⅔] | BACK | 816 |
| [0 ÷ ⅓] | [⅔ ÷ 1] | BACK-RIGHT | 818 |

A value (v,ω) falling within one of the platform space portions is translated to the associated respective discrete control command. For example, the value 824 falling within the rectangle 806 produces a FORWARD RIGHT action. Moreover, it should be further understood that while the foregoing table is represented by a grid of rectangular portions, the translation is not so limited. For example, any other partitioning, or piecewise function could be used with equivalent success.

In some implementations of the decoder 424 corresponding to a continuous control space corrector 412 implementations, the decoder 424 may be configured to apply an argmax operation (i.e., the set of values for which a corresponding function attains its largest resultant value) to the control vector so as to transform the continuous control data into discrete steering/drive commands corresponding to actions shown Table 1. In one or more continuous decoder implementations, the decoder may be configured to apply an interpolation operation between two or more activation control states to determine a control command corresponding to an intermediate value between these states, e.g., as illustrated in FIG. 8.

In some implementations the encoder may be configured to map the user's control signal in (velocity v, rate of rotation w) space (v,w) into a vector of dimension N; and the decoder may be configured to map a vector of dimension N into a control signal in the space (v,w). By way of an illustration of a continuous decoder implementation, a control vector C may be configured in a range [[0, 1]^2] (where R^n is used to define an n-dimensional range (i.e., a square area in this case)). The individual element of the control vector C may contain individual control commands (for example a pair of analog signals for turning a remote-controlled vehicle, and a drive signal for driving the remote-controlled vehicle forward). The control signal that is decoded from this vector may comprise values denoted by hashed circles 824, 828. The use of the discrete control values corresponding to the circles 824, 828 may cause discontinuous motion of the vehicle (e.g., jerks along a trajectory). An interpolation procedure may be utilized to produce an intermediate control value denoted by black circle 826 in FIG. 8 that may provide a smoother vehicle trajectory. In some implementations, the interpolation may comprise a weighted combination of the elements in the control vector. In some implementations of encoding a control signal comprising a bi-polar velocity v signal and rate of rotation w, an encoder (e.g., the adapter 1124 in FIG. 11) may be configured to rectify one or both continuous components (e.g., v and/or w) into a range [−1, 1]. Discretizing the continuous components (e.g., v and/or w) into a discrete range of values (e.g., (−1, −0.5, 0, 0.5, 1) facilitate control signal determination by the predictor (e.g., 1110 in FIG. 11).

The corrector 412 may receive a control input 428 from a control entity. The control input 428 may be determined based on one or more of (i) sensory input 402 and (ii) feedback from the platform (not shown). In some implementations, the feedback may comprise proprioceptive signals, such as feedback from servo motors, joint position sensors, and/or torque resistance. In some implementations, the sensory input 402 may correspond to the sensory input, described, e.g., with respect to FIGS. 1-2, supra. In one or more implementations, the control entity providing the input 428 to the corrector may comprise a human trainer, communicating with the robot via a remote controller (wired and/or wireless). In some implementations, the control entity may comprise a computerized agent such as a multifunction adaptive controller operable using reinforcement and/or unsupervised learning and capable of training other robotic devices for one and/or multiple tasks. In one such implementation, the control entity and the corrector 412 may comprise a single computerized apparatus.

The corrector 412 may be operable to generate control signal 408 using a plurality of approaches. In some implementations of analog control for robotic vehicle navigation, the corrector output 408 may comprise target vehicle velocity and target vehicle steering angle (e.g., the turn 306 in FIG.

3A). Such implementations may comprise an "override" functionality configured to cause the robotic platform 430 to execute action in accordance with the user-provided control signal instead of the predicted control signal.

In one or more implementations of analog correction provision for robotic vehicle navigation, the control signal 408 may comprise a correction to the target trajectory (e.g., correction 338 in FIG. 3B). The signals 408 may comprise a target "correction" to the current velocity and/or steering angle of the platform 430. In one such implementation, when the corrector output 408 comprises a zero signal (or substantially a null value), the platform 430 may continue its operation unaffected.

In some implementations of state space for vehicle navigation, the actions of the platform 430 may be encoded using, e.g., a 1-of-10 integer signal, where eight (8) states indicate 8 possible directions of motion (e.g., forward-left, forward, forward-right, left, right, back-left, back, back-right), one state indicates "stay-still", and one state indicates "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for a vehicle navigation, the action space of the platform 430 may be represented as a 9-element state vector, e.g., as described with respect to FIG. 8. Individual elements of the state vector may indicate the probability of the platform being subjected to (i.e., controlled within) a given control state. In one such implementation, output 418 of the predictor 422 may be multiplied with the output 408 of the corrector 412 in order to determine probability of a given control state.

The adaptive predictor 422 may be configured to generate predicted control signal $u^P$ 418 based on one or more of (i) the sensory input 402 and the platform feedback (not shown). The predictor 422 may be configured to adapt its internal parameters, e.g., according to a supervised learning rule, and/or other machine learning rules.

Predictor realizations comprising platform feedback, may be employed in applications such as, for example, where: (i) the control action may comprise a sequence of purposefully timed commands (e.g., associated with approaching a stationary target (e.g., a cup) by a robotic manipulator arm), or where (ii) the platform may be characterized by platform state parameters (e.g., arm inertia, and/or motor response time) that change faster than the rate of action updates. Parameters of a subsequent command within the sequence may depend on the control plant state; a "control plant" refers to the logical combination of the process being controlled and the actuator (often expressed mathematically). For example, control plant feedback might be the exact location and/or position of the arm joints which can be provided to the predictor.

In some implementations, the predictor 422 may comprise a convolutional network configured to predict the output 420 of the combiner 414 given the input 402. The convolutional network may be combined with other components that learn to predict the corrector signal given other elements of the sensory context. When the corrector 412 output comprises a zero signal (or null value), the combiner output 420 may equal the predictor output 418. When the corrector provides a non-zero signal, a discrepancy may occur between the prediction 418 and the output 420 of the combiner 414. The discrepancy may be utilized by the predictor 422 in order to adjust parameters of the learning process in order to minimize future discrepancies during subsequent iterations.

The sensory input and/or the plant feedback may collectively be referred to as sensory context. The sensory context may be utilized by the predictor 422 to produce the predicted output 418. By way of a non-limiting illustration, one exemplary scenario of obstacle avoidance by an autonomous rover uses an image of an obstacle (e.g., wall representation in the sensory input 402) combined with rover motion (e.g., speed and/or direction) to generate Context_A. When the Context_A is encountered, the control output 420 may comprise one or more commands configured to avoid a collision between the rover and the obstacle. Based on one or more prior encounters of the Context_A—avoidance control output, the predictor may build an association between these events as described in detail below.

The combiner 414 may implement a transfer function h(x) where x includes the control signal 408 and the predicted control signal 418. In some implementations, the combiner 414 operation may be expressed, e.g., as described in detail in co-owned U.S. patent application Ser. No. 13/842,530 entitled "ADAPTIVE PREDICTOR APPARATUS AND METHODS", filed Mar. 15, 2013, as follows:

$$\hat{u} = h(u, u^P). \tag{Eqn. 1}$$

Various realizations of the transfer function of Eqn. 1 may be utilized. In some implementations, the transfer function may comprise one or more of: addition, multiplication, union, a logical 'AND' operation, a logical 'OR' operation, and/or other operations.

In one or more implementations, the transfer function may comprise a convolution operation, e.g., a dot product. In spiking network realizations of the combiner function, the convolution operation may be supplemented by use of a finite support kernel (i.e., a mapping function for linear space to a non-linear space) such as Gaussian, rectangular, exponential, etc. In one embodiment, a finite support kernel may implement a low pass filtering operation of input spike train(s). In some implementations, the transfer function h may be characterized by a commutative property. (Eqn. 2)

In one or more implementations, the transfer function of the combiner 414 may be configured as follows:

$$h(0, u^P) = u^P. \tag{Eqn. 3}$$

In some implementations, the transfer function h may be configured as:

$$h(u, 0) = u. \tag{Eqn. 4}$$

In some implementations, the transfer function h may be configured as a combination of realizations of Eqn. 3-Eqn. 4 as:

$$h(0, u^P) = u^P, \text{ and } h(u, 0) = u, \tag{Eqn. 5}$$

In one exemplary implementation, the transfer function satisfying Eqn. 5 may be expressed as:

$$h(u, u^P) = (1-u) \times (1-u^P) - 1. \tag{Eqn. 6}$$

In one such realization, the combiner transfer function is configured according to Eqn. 3-Eqn. 6, to implement additive feedback. In other words, output of the predictor (e.g., 418) may be additively combined with the control signal (408) and the combined signal 420 may be used as the teaching input (404) for the predictor. In some implementations, the combined signal 420 may be utilized as an input (context) into the predictor 422, e.g., as described in co-owned U.S. patent application Ser. No. 13/842,530 entitled "ADAPTIVE PREDICTOR APPARATUS AND METHODS", filed Mar. 15, 2013, incorporated supra.

In some implementations, the combiner transfer function may be characterized by a delay expressed as:

$$\hat{u}(t_{i+1})=h(u(t_i),u^P(t_i)), \quad \text{(Eqn. 7)}$$

where $\hat{u}(t_{i+1})$ denotes combined output (e.g., 420 in FIG. 4) at time t+Δt.

As used herein, symbol $t_i$ may be used to refer to a time instance associated with individual controller update events (e.g., as expressed by Eqn. 7), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

In some implementations, the combiner transfer function may be configured to implement override functionality (e.g., override combiner). The "override" combiner may detect a non-zero signal provided by the corrector, and provide a corrector signal as the combined output. When a zero (or no) corrector signal is detected, the predicted signal may be routed by the combiner as the output. In some implementations, the zero corrector signal may be selected as not a value (NaN); the non-zero signal may comprise a signal rather than the NaN.

In one or more implementations of a multi-channel controller, the corrector may simultaneously provide "no" signal on some channels and "a" signal on others, allowing the user to control one degree of freedom (DOF) of the robotic platform while the predictor may control another DOF.

It will be appreciated by those skilled in the art that various other realizations of the transfer function of the combiner 414 may be applicable (e.g., comprising a Heaviside step function, a sigmoid function, such as the hyperbolic tangent, Gauss error function, logistic function, and/or a stochastic operation). Operation of the predictor 422 learning process may be aided by a teaching signal 404. As shown in FIG. 4, the teaching signal 404 may comprise the output 420 of the combiner 414. In some implementations wherein the combiner transfer function may be characterized by a delay (e.g., Eqn. 7), the teaching signal at time $t_i$ may be configured based on values of u, $u^P$ at a prior time $t_{i-1}$, for example as:

$$u^d(t_i)=h(u(t_{i-1}),u^P(t_{i-1})). \quad \text{(Eqn. 8)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1})=F[x_i,W(u^d(t_i))]. \quad \text{(Eqn. 9)}$$

In Eqn. 9, the function W may refer to a learning process implemented by the predictor, e.g., a perceptron, and/or a look-up table.

In one or more implementations, such as illustrated in FIG. 4, the sensory input 406, the control signal 408, the predicted output 418, the combined output 420 and/or plant feedback may comprise spiking signals, analog signals, and/or a combination thereof. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned and co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, incorporated supra.

Output 420 of the combiner e.g., 414 in FIG. 4 may be gated. In some implementations, the gating information may be provided to the combiner by the corrector 412 using, e.g., an "override" indication in order to cause the robotic platform 430 to execute actions according to the user-provided control instead of the predicted control signal.

In one such realization of spiking controller output, the control signal 408 may comprise positive spikes indicative of a control command and configured to be combined with the predicted control signal (e.g., 418); the control signal 408 may comprise negative spikes, where the timing of the negative spikes is configured to communicate the control command, and the (negative) amplitude sip is configured to communicate the combination inhibition information to the combiner 414 so as to enable the combiner to 'ignore' the predicted control signal 418 for constructing the combined output 420.

In some implementations of spiking signal output, the combiner 414 may comprise a spiking neuron network; and the control signal 408 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 420 in FIG. 4).

The gating information may be provided to the combiner by another entity (e.g., a human operator controlling the system with a remote control and/or external controller) and/or from another output from the corrector 412 (e.g., an adaptation block, an optimization controller). In one or more implementations, the gating information may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 420) to be comprised solely of the control signal portion 418, e.g., configured in accordance with Eqn. 4. In one or more implementations the gating information may be used to suppress ('veto') provision of the context signal to the predictor without affecting the combiner output 420. In one or more implementations the gating information may be used to suppress ('veto') the feedback from the platform.

In one or more implementations, the gating signal may comprise an inhibitory indication that may be configured to inhibit the output from the combiner. Zero combiner output may, in some realizations, may cause zero teaching signal (e.g., 414 in FIG. 4) to be provided to the predictor so as to signal to the predictor a discrepancy between the target action (e.g., controller output 408) and the predicted control signal (e.g., output 418).

The gating signal may be used to veto predictor output 418 based on, for example, the predicted control output 418 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

In one or more implementations, the gating/veto functionality may be implemented on a "per-channel" basis in a multi-channel controller wherein some components of the combined control vector may comprise predicted components, while some components may comprise the corrector components.

By way of a non-limiting illustration, if the turn is to be completed and/or aborted (due to, for example, a trajectory change and/or sensory input change), and the predictor output still produces turn instructions to the plant, the gating signal may cause the combiner to veto (ignore) the predictor contribution and pass through the controller contribution.

Predicted control signal 418 and the control input 408 may be of opposite signs. In one or more implementations, a positive predicted control signal (e.g., 418) may exceed the target output that may be appropriate for performance of as task. The control signal 408 may be configured to include negative signaling in order to compensate for over-prediction by the predictor.

Gating and/or sign reversal of controller outputs may be useful, for example, where the predictor output is incompatible with the sensory input (e.g., navigating towards a wrong target). Rapid changes in the environment (compared to the predictor learning time scale caused by e.g., appearance of a new obstacle, target disappearance), may require an "override" capability for the controller (and/or supervisor) to 'override' predictor output. In one or more implementations compensation for over-prediction may be controlled by a graded form of the gating signal.

In some implementations, the predictor learning process may be configured based on one or more look-up tables (LUT). Table 2 and Table 3 illustrate the use of look up tables for learning obstacle avoidance behavior.

Table 2 and Table 3 present exemplary LUT realizations characterizing the relationship between sensory input (e.g., distance to obstacle d) and control signal (e.g., turn angle α relative to current course) obtained by the predictor during training. Columns labeled N in Table 2 and Table 3, present use occurrence N (i.e., how many times a given control action has been selected for a given input, e.g., distance). Responsive to the selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 3), responsive to the selection of one action (e.g., turn of +15°) during learning, the counter N for that action may be incremented while the counter for the opposing action may be decremented.

As seen from the example shown in Table 2, the controller may produce a turn command as a function of the distance to obstacle falling to a given level (e.g., 0.7 m). As shown, a 15° turn is most frequently selected during the training for sequence. In some implementations, the predictor may be configured to store the LUT (e.g., Table 2) data for use during subsequent operation. During operation, the most frequently used response (e.g., turn of 15°) may be output for a given sensory input, in one or more implementations, In some implementations, the predictor may output an average of stored responses (e.g., an average of rows 3-5 in Table 2).

TABLE 2

| d | α° | N |
|---|---|---|
| 0.9 | 0 | 10 |
| 0.8 | 0 | 10 |
| 0.7 | 15 | 12 |
| 0.7 | 10 | 4 |
| 0.7 | 5 | 1 |
| ... | | |
| 0.5 | 45 | 3 |

TABLE 3

| d | α° | N |
|---|---|---|
| 0.9 | 0 | 10 |
| 0.8 | 0 | 10 |
| 0.7 | 15 | 12 |
| 0.7 | −15 | 4 |
| ... | | |
| 0.5 | 45 | 3 |

In some implementations, the predictor 422 learning process may be configured to detect targets and/or obstacles based on sensory input (e.g., 402 in FIG. 2). In some implementations, the detection may be configured based on an operation of a multi-layer perceptron and/or a convolutional network.

FIG. 5A illustrates an adaptive predictor of a robotic controller (e.g., the predictor 422 of FIG. 4) comprising a trainable convolutional network, configured in accordance with one implementation. The adaptive predictor 500 may be configured to receive sensory input 502 and to produce control output 520. The predictor 500 may be operable in accordance with a learning process (e.g., supervised, reinforcement, and/or combination thereof) configured based on a teaching input 524. In some implementations, the input 524 may comprise an output of a combiner (such as e.g., the output 420 of the combiner 414 in FIG. 4).

In some implementations, the input 502 may comprise a plurality of frames of digital pixels produced by video camera, e.g., as described above with respect to FIG. 2 and FIG. 4. The output 520 may comprise one or more control commands (e.g., motor control) configured to cause a robotic platform (e.g., the rover 110 in FIG. 1) to perform a task (e.g., an obstacle avoidance trajectory such as illustrated by trajectory 316 in FIG. 3A). In some implementations, the output 520 may comprise data in an internal network representation configured to be adapted for a given controllable platform (e.g., 430 in FIG. 4) by a decoder component (e.g., 424 in FIG. 4). The output 520 may be combined with a control signal provided by a corrector (e.g., 414 in FIG. 4).

Input 502 frames may comprise representation of one or more objects (e.g., 124, 126 in FIG. 1 and/or 308, 318 in FIG. 3A). FIG. 7 illustrates an exemplary frame 700 comprising a representation of a circular object 702. The object shape, orientation, and/or position may change from one frame to another. The robotic device may be expected to avoid obstacles characterized by a plurality of appearances (e.g., 308, 318 in FIG. 3A).

The predictor 500 may operate a convolutional neural network configured to detect (recognize) one or more objects and/or object features in the sensory input 502. The predictor may be configured to learn to determine (predict) control output 520 (e.g., control signals for actuators of a robotic vehicle) based on the received images 502.

In some implementations, the predictor 500 network may comprise a multilayer artificial neuron network, configured for object recognition. Learning may be implemented using an error back propagation algorithm, comprising computing a "cost" quantifying a discrepancy between the predicted motor signal and the actual motor signal, and minimizing the trainable parameters of the convolutional network with respect to this cost using a gradient-descent methodology.

The network may comprise two or more layers of neurons, e.g., as described in co-owned and co-pending U.S. patent application Ser. No. 14/054,366 entitled "APPARATUS AND METHODS FOR BACKWARD PROPAGATION OF ERRORS IN A SPIKING NEURON NETWORK", filed Oct. 15, 2013, the foregoing being incorporated herein by reference in its entirety. The first layer or input layer, denoted 504 in FIG. 5A may comprise a plurality of neurons configured to perform a two-dimensional convolution of an input 502 image frame (e.g., the frame 700 in FIG. 7) with a two-dimensional spatial filter (e.g., denoted by rectangles 710, 712 in FIG. 7). In some implementations the filter 710 may comprise a plurality of elements (e.g., between 1 and 40 for a frame dimension between 10 and 1000 pixels). During an initialization operation, the filter elements may be assigned randomly distributed weights (e.g., between 0 and 1). The convolution may comprise a multiplication of pixel values by filter coefficient values. Common examples of pixel values include e.g., red, green, blue (RGB) values, luminosity and red-blue chrominance (YCrCb), etc. In one such implementation of color image processing, three individual filters may be convolved with the respective red, green and blue image components of the frame 700. Multiple filter instances may be utilized (e.g., a bank of filters). By way of an illustration of processing a 3-color image of size [3,Nx,Ny], filter components may comprise three banks of Nb filters, with individual filters (e.g., 710) of a dimension [nx, ny], where nx is less than Nx, and ny is less than Ny. In some implementations, the filter bank size Nb may be selected from the range between 3 and 500 (e.g., 12 in one implementation). Convolution operation output $H_i$ for the i-th filter may be expressed as follows:

$$H_i = k_{i,R} R + k_{i,G} G + k_{i,B} B \qquad \text{(Eqn. 10)}$$

where R, G, B denote red, green and blue input channels, respectively.

In some implementations, the use of a convolutional feature extraction by the component 504 of the predictor 500 may enable invariance of the component 504 output to translational motion of features in the input 502 from one frame to another (also referred to as the translational invariance). The use of convolutional feature extraction may enable sharing of features across the visual space. A single bank of filters may be applied at different translations along dimensions of the input image. Individual filters within the filter bank may be applied to a plurality of locations (e.g, shared between locations). The convolution operation may be interpreted as a projection of the filter onto a portion of an image, with projection weights corresponding to connection weights to neurons of the hidden layer. Weights of individual connections for a given filter may be kept constant when receiving projections from different portions of the input image. In some cases, the weights may vary from one image to another.

The output of the convolution operation by the first layer 504 (e.g., the output described by Eqn. 10) may be passed through a sub-sampling transformation. In some implementations, the transformation may comprise a "max-pooling" operation P(H)—a form of compression (down sampling) in which the signal $H_i$ is split into patches and the pixel with the maximum value in each patch is assigned to the output $h_i$:

$$h_i = P(H_i) \qquad \text{(Eqn. 11)}$$

In some implementations the individual region size may comprise 2×2 pixels. It will be appreciated by those skilled in the arts that various region size configurations may be utilized, e.g., 3 pixel, 4×4 pixel, and/or other. In one or more implementations, various other methodologies of information encoding may be utilized in order to reduce data rate of the output $H_i$.

A trainable "bias term" $b_i$ is may be added to individual frames Hi as follows:

$$hb_i = h_i + b_i \qquad \text{(Eqn. 12)}$$

In one or more implementations, the term $b_i$ may comprise a scalar and/or a vector of size of the array $h_i$. Output of these operations (e.g., $hb_i$ of Eqn. 12) may be passed through a nonlinear transformation. In some implementations, the nonlinear transformation may comprise a sigmoid function, a hyperbolic tangent, and/or a rectified-linear function, to produce output 506 $ho_i$.

$$ho_i = S(hb_i) \qquad \text{(Eqn. 13)}$$

The output 506 may be referred to as the hidden-layer data. The layer output 506 may be communicated to the second layer or output layer 514. The output layer may comprise a plurality of artificial neurons. In some implementations, the number of the output layer neurons may be configured in accordance with, e.g., the number of discrete state space values for a given robotic platform (e.g., 10 states as described above with respect to FIG. 4). The output layer 514 may comprise a plurality of units (artificial neurons). The number of output layer units may be configured in accordance with a number of discrete control states (e.g., 9 units may correspond to the state configuration shown in FIG. 8). The units of the hidden layer may be connected to units of the hidden layer using an all-to-all connection in a fully connected implementation. The individual connections may be further characterized by connection efficacy. Connection efficacy may refer to a magnitude and/or probability of input spike influence on neuronal response (i.e., output spike generation or firing). In one embodiment, connection efficacy comprises a synaptic weight parameter that changes one or more state variables of post synaptic unit. During operation of the network, connection efficacy may be dynamically adjusted in accordance with a learning mechanism of the network.

The output layer 514 may be configured to transform the hidden layer output 506 into the control output 520. In some implementations, the transformation may be expressed as follows:

$$x_j = ho_i w_{i,j} \qquad \text{(Eqn. 14)}$$

Where $x_j$ is the output vector of dimension M, $ho_i$ is the hidden layer output of dimension K, and $w_{i,j}$ is an array of efficacies (of dimension K×M) configured to characterize connections between K hidden layer neurons and M output layer neurons. The output of the operation of Eqn. 14 may be passed through a second nonlinear transformation S2, as follows:

$$xs_j = S2(x_j) \qquad \text{(Eqn. 15)}$$

In one or more implementations, the second nonlinear transformation may comprise a sigmoid, hyperbolic-tangent, softmax, rectified-linear function, and/or the identity transformation. An offset component $b2_j$ may be added to the output of the second nonlinear transformation (e.g., using Eqn. 15) to produce the output layer output 520 $u_j$:

$$u_j = xs_j + b2_1. \qquad \text{(Eqn. 16)}$$

In Eqn. 16, the offset $b2_j$ may comprise a vector of dimension M. The offset vector components $b2_1$ may be learned during operation of the predictor 500. In some implementations, the learning of the offset vector components may be configured to cause the robotic platform to execute a default action (e.g., stop, move forward) when the input is noisy and/or the control action cannot be unambiguously determined by the output $xs_j$ alone.

The learning process of the predictor may be configured to minimize a discrepancy between the output 520 and output of the combiner (e.g., the output 420 in FIG. 4). The predictor 500 of FIG. 5 may receive the combiner output via pathway 524. The predictor 500 may comprise a cost evaluation component 518 configured to determine the discrepancy between the predictor output 522 and the combiner output 524. In some implementations of analog control output, the discrepancy may be computed as the mean-squared-error. In one or more implementations, the discrepancy may be determined using a cross-entropy or negative-log-likelihood operation.

The discrepancy determined by the component 518 may be utilized in order to adapt the predictor 500 network. In some implementations, a gradient descent may be employed, wherein a gradient of the discrepancy 526 with respect to learning parameters of the output layer 514 may be utilized in order to adapt the layer 514 learning parameters (e.g., $b2_j$ in Eqn. 16, and/or $w_{i,j}$ in Eqn. 14). A gradient of the discrepancy 526 with respect to learning parameters of the input layer 504 may be utilized in order to adapt the input layer 504 learning parameters (e.g., filter coefficients in Eqn. 10). In some implementations, discrepancy gradient with respect to the parameters of the output layer (determined by the component 514) may be propagated back to the input layer component 504 via pathway 528. Some implementations of gradient-based error propagation are described in co-owned and co-pending U.S. patent application Ser. No. 14/054,366 entitled "APPARATUS AND METHODS FOR BACKWARD PROPAGATION OF ERRORS IN A SPIKING NEURON NETWORK", filed Oct. 15, 2013, incorporated supra, and/or co-owned U.S. patent application Ser. No. 13/487,499 entitled "STOCHASTIC APPARATUS AND METHODS FOR IMPLEMENTING GENERALIZED LEARNING RULES", filed Jun. 4, 2012, issued as U.S. Pat. No. 9,104,186 on Aug. 11, 2015, the foregoing being incorporated herein by reference in its entirety. Efficacy adjustment configured based on a gradient method may generally be expressed as follows:

$$\Delta w \sim \frac{dE}{w_j}, \quad \text{(Eqn. 17)}$$

where $w_j$ denotes efficacy of j-th connection, $\Delta w$ denotes efficacy adjustment and E represents performance (e.g., cost).

In some implementations, the network update 526 and/or 528 may comprise online operation(s) where efficacy adjustments due to a given input (e.g., frame 700 of FIG. 7) may be implemented in real-time so that processing of a subsequent input frame may be configured based on an adjusted network.

The input 524 may be referred to as a teaching input. When the output 520 matches the teaching input 524, the discrepancy output 526 may comprise a zero signal. The discrepancy 526 determined during a given iteration, is utilized by the predictor 500 in order to adjust parameters of the learning process to minimize discrepancy during subsequent iterations. It will be recognized by those skilled in the arts that although a single hidden layer output 506 is shown and described with respect to FIG. 5A, multiple hidden layers may be employed between the input layer 504 and the output layer 514 in some implementations. Individual hidden layers may be, in various implementations, connected by convolutional kernels or fully connected weight matrices. Deeper networks may enable learning of more abstract relationships between the input (e.g., the image) and the motor command. For example, a deeper network can learn to respond to objects of given shape, as opposed to just "dark objects over there".

FIG. 5B illustrates a trainable convolutional network apparatus comprising an unsupervised learning component, in accordance with one implementation. The convolutional network apparatus 540 may be configured to implement an adaptive predictor of a robotic controller (e.g., the predictor 422 of FIG. 4). The convolutional network apparatus 540 may operate a convolutional neural network configured to detect (recognize) one or more objects and/or object features in sensory input 542. The network may be configured to learn to determine (predict) control output 558 (e.g., control commands configured to cause a robotic device to execute an action) based on the received images 542. The convolutional network apparatus 540 network of FIG. 5B may comprise an input layer 544, configured to receive the input 542, one or more hidden layers 550, and an output layer 560 configured to produce the predicted control output 558 (e.g., the output 418 in FIG. 4).

In some implementations, the input 542 may comprise a plurality of frames of digital pixels produced by video camera, e.g., as described above with respect to FIG. 2 and FIG. 4. The output 558 may comprise one or more control commands (e.g., motor control) configured to cause a robotic platform (e.g., the rover 110 in FIG. 1) to perform a task (e.g., a turn away from obstacle trajectory 316 in FIG. 3A). In some implementations, the output 558 may comprise data in an internal network representation configured to be adapted for a given controllable platform (e.g., 430 in FIG. 4) by a decoder component (e.g., 424 in FIG. 4). The output 558 may be combined by a combiner component 584 with a control signal 586. In some implementations, the input 586 may be provided by a corrector (e.g., 412 in FIG. 4) and/or another control entity (e.g., a used via a remote control handset).

Input 542 frames may comprise representation of one or more objects (e.g., 124, 126 in FIG. 1 and/or 308, 318 in FIG. 3A). FIG. 7 illustrates an exemplary frame 700 comprising a representation of a circular object 702. The object shape, orientation, and/or position may change from one frame to another. The robotic device may be expected to avoid obstacles characterized by a plurality of appearances (e.g., 308, 318 in FIG. 3A).

In some implementations, learning by the network of the convolutional network apparatus 540 may be implemented using an error back propagation algorithm that includes computing a "cost"; as used herein, a "cost" is a scalar value quantifying the discrepancy between the predicted control signal and a target control signal associated with a given task. Learning parameters of the network may be modified in order to minimize a given cost function network using a gradient-descent methodology, e.g., as described in detail in co-owned U.S. patent application Ser. No. 13/487,499 entitled "STOCHASTIC APPARATUS AND METHODS FOR IMPLEMENTING GENERALIZED LEARNING RULES", filed Jun. 4, 2012 and issued as U.S. Pat. No. 9,104,186 on Aug. 11, 2015, incorporated supra.

In some implementations, the neural network components 554, 550, 560 may be configured to implement operations described above with respect to FIG. 5A (e.g., according to Eqn. 10-Eqn. 16).

Output 554 of the hidden layer 550 may be provided to an input reconstruction component comprising a convolutional component 566 and reconstruction cost determination component 570. In some implementations, the components 566, 570 may be configured to operate as a "auto-encoder". As used herein, an auto-encoder may refer to an artificial neural network used for learning efficient codings. The aim of an auto-encoder is to learn a compressed, distributed representation (encoding) for a set of data, for example, in order to reduce input dimensionality. In the implementation illustrated in FIG. 5B, the neural network of the apparatus 540 may be configured to reconstruct the input 542 while learning to predict the control signal 580. The aim of this implementation is to enable faster learning of the filter bank coefficients of the component 544 and/or with using fewer training sets.

The hidden layer output 554 may be provided to the convolution component 566 configured to convolve the output 554 with filters of a restoration filter bank configured to convert the signal 554 into the original input 542. Output 568 of the convolution component 566 may be provided to the restoration cost determination component 570. The component 570 may be configured to determine a match (or a discrepancy) between the input signal 542 and restored signal 568.

In some implementations, the discrepancy determination by the component 570 may be configured based on a determination of mean squared error, cross entropy, log-likelihood, and/or other operations. Output 578 and 588 of the component 570 may be utilized to adapt (learn) coefficients of filters of the input layer 544 and/or filters of the restoration component 566, respectively.

The learning process of the convolutional network apparatus 540 (e.g., the components 544, 550, 560) may be configured to minimize a discrepancy between the output 558 and output of the combiner (e.g., the output 420 in FIG. 4). The convolutional network apparatus 540 of FIG. 5B may comprise a combiner 584. The network of the apparatus 540 may be operable in accordance with a learning process (e.g., supervised, reinforcement, and/or combination thereof) configured based on a teaching signal. In some implementations, the apparatus 540 output 580, 582 may be configured based on an external signal 586 configured based on, e.g., a remote control command of a trainer.

The apparatus 540 may comprise a cost evaluation component 564. The output of the combiner 584 may be provided to the cost evaluation component 564 via pathway 580. Predicted control output (e.g., the output 558 of the output layer 560) may be provided to the cost evaluation component 564 via pathway 562. The cost evaluation component 564 may be configured to determine a discrepancy between the predicted control output 562 and the combiner output 582. In some implementations of analog control output, the discrepancy may be computed as the mean-squared-error. In one or more implementations of discrete and/or analog (continuous) control output the discrepancy may be determined using a cross-entropy, a log-likelihood operation, and/or other approaches.

The discrepancy determined by the cost evaluation component 564 may be utilized by the convolutional network apparatus 540 in order to adapt the network (e.g., the components 544, 560 in FIG. 5B). The discrepancy determined by the component 564 may be based on a gradient approach wherein a gradient of the discrepancy 556 with respect to learning parameters of the layer 560 may be utilized in order to adapt the layer 560 learning parameters (e.g., $b2_j$ in Eqn. 16, and/or $w_{i,j}$ in Eqn. 14). A gradient of the discrepancy 556 with respect to learning parameters of the component 544 may be utilized in order to adapt the layer 544 learning parameters (e.g., filter coefficients in Eqn. 10). In some implementations, discrepancy gradient with respect to the parameters of the output layer (determined by the component 560) may be propagated back to the input layer component 544 via pathway 576.

The input 580 may be referred to as a teaching input. When the output 558 matches the teaching input 580, the discrepancy output 556 may comprise a zero signal. The discrepancy 556 determined during a given iteration, may be utilized by the apparatus 550 in order to adjust parameters of the learning process in order to minimize discrepancy during subsequent iterations.

It will be recognized by those skilled in the arts that although a single hidden layer 550 is shown and described with respect to FIG. 5B, multiple hidden layers may be employed between the input layer component 544 and the output layer component 560. In various implementations, individual hidden layers may be connected by a convolutional kernel and/or a fully connected weight matrix, e.g., as described above with respect to of Eqn. 14.

The convolutional network apparatus 540 may comprise a combiner component 584 configured to combine the predicted output 558 and control input 586. In some implementations, e.g., as described in co-owned U.S. patent application Ser. No. 13/842,562 entitled "ADAPTIVE PREDICTOR APPARATUS AND METHODS FOR ROBOTIC CONTROL", filed Mar. 15, 2013, incorporated supra, the control input 586 may comprise a target output (e.g., the instruction to execute the action 306 in FIG. 3A). The target output may comprise a control signal and/or a correction signal (e.g., the teaching inputs 336, 346, 348 in FIG. 3B), configured to cause execution of a task by a robotic device.

In some implementations, the combiner 584 may be operable in accordance with methodologies described above with respect to FIG. 4. In one or more implementations, the combiner 584 may be operable to implement a veto process wherein: (i) based on occurrence of non-zero target input 586, the predicted output 558 is disregarded so that the combiner output 582 is comprised solely of a copy of the input 586; (ii) based on occurrence of a zero target input 586, the predicted output 558 may be passed through as the output 582. In some implementations of a stochastic controller, the input 586 may comprise a parameter conveying a probability associated with individual output states (e.g., the states 802, 804, and/or other in FIG. 8). The input 586 probability vector may be multiplied by a predicted output probability vector 558 to produce the output probability vector 582.

Figure 11:
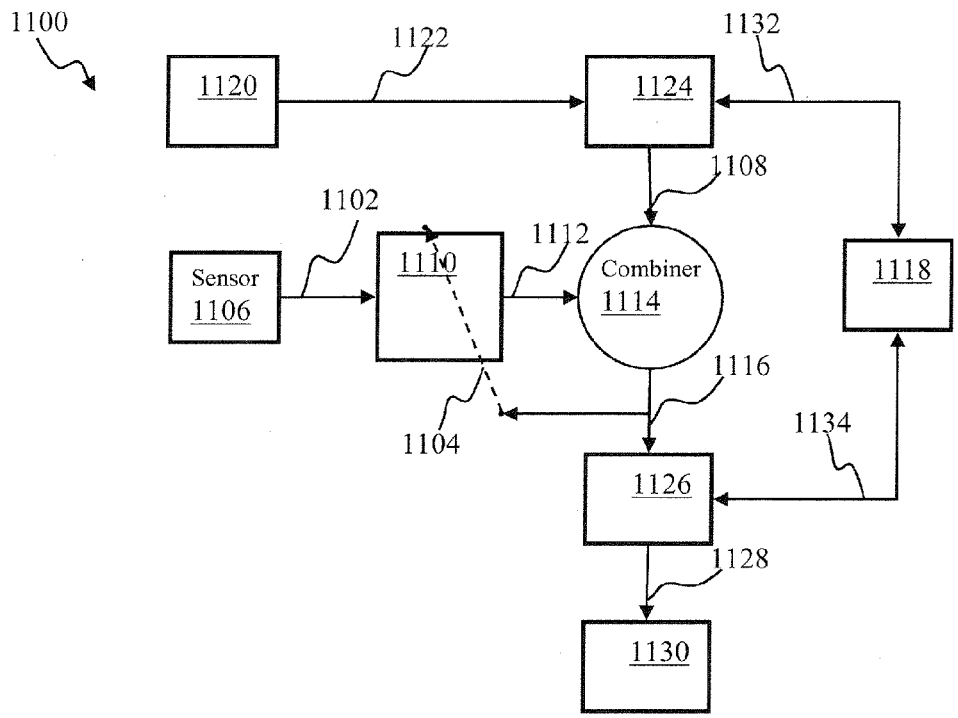
FIG. 11 is a block diagram illustrating a system comprising a learning apparatus configured for controlling a robotic platform, according to one or more implementations.

FIG. 11 illustrates a system 1100 comprising a learning apparatus comprising a combiner configured for controlling a robotic platform 1110 (e.g., the vehicle 110 of FIG. 1), according to one or more implementations. The system 1100 of FIG. 11 may comprise an adaptive predictor 1110 configured to produce predicted control output 1112. The predictor 1110 may be trained using a remote control device 1120 using online training methodology described herein. In one or more implementations, the remote control device 1120 may comprise a remote control handset (e.g., 102 in FIG. 1A) operable by a trainer performing a target task (e.g., following the trajectory 330 of FIG. 3A) with the robotic device 1130. In some implementations, the remote control device 1120 may comprise a computerized agent (e.g., comprising a trained adaptive controller 210 of FIG. 2) and configured to operate the robotic device 1130 in accordance with a target trajectory. In some implementations, the remote control device 1120 may comprise a remote transmitter (e.g., IR, RF, light) such as, e.g., described in co-owned U.S. patent application Ser. No. 14/244,892 entitled "SPOOFING REMOTE CONTROL APPARATUS AND METHODS", filed on Apr. 3, 2014, the foregoing being incorporated herein by reference in its entirety. The input 1122 may comprise one or more instructions configured to cause the robotic device 1130 to perform a task (e.g., execute action 306 in FIG. 3A).

The system 1100 may further comprise a sensor component 1106 configured to provide information related to task execution by the robotic device 1130. In some implementations, such as navigation, classification, object recognition, and/or obstacle avoidance, the information 1102 provided by the sensor component 1106 may comprise the input 402, 502, 542 described above with respect to FIGS. 4-5B (e.g., stream of video frames).

The system 1100 may comprise interface logic 1124 (also referred to as an adapter) configured to detect remote instructions 1122. In some implementations, the interface logic 1124 may provide one or more output channels 1108 wherein individual output channels 1108 may be configured to convey information associated with individual control actions, e.g., such as illustrated in Table 4, below:

TABLE 4

| Action | Channel 1 | Channel 2 | Channel 3 | Channel 4 |
|---|---|---|---|---|
| Forward | 1 | 0 | 0 | 0 |
| Backward | 0 | 1 | 0 | 0 |
| Left | 0 | 0 | 1 | 0 |
| Right | 0 | 0 | 0 | 1 |

The adapter component 1124 may be configured to adapt the format of the input 1122 to a specific format of the combiner and/or the predictor learning process 1110. By way of an illustration, the predictor learning process 1110 may be configured to operate using three discrete states wherein a state value 1 may denote activation of a signal; a state value of 0 may denote signal de-activation; and a high impedance value (e.g., 0.5) leaves the signal as is (i.e., in an active or inactive state). The adapter component 1124 may convert binary control input 1122 into the above discrete states, in some implementations. By way of an illustration, a "FORWARD" instruction may be expressed as {1, 0, 0, 0} while output 1108 of the adapter component 1124 may be configured as {1, Z, Z}. In some implementations, the adapter 1124 may receive such information (e.g., shown in Table 4) from a translation component 1118 via pathway 1132. The translation component 1118 comprises a bi-directional look up table comprising transcoding information (e.g., information in Table 4).

The adaptive predictor 1110 may operate a learning process configured to produce the output 1112. In some implementations of robotic operation and/or control, the output 1112 may comprise signals and/or instructions corresponding to a respective channel 1108 (e.g., commands forward, backward, left, right illustrated in Table 4). The predictor 1110 learning process may be configured based on teaching input 1104, comprising output of the combiner 1114. In some implementations of robotic operation and/or control, the teaching input 1104 may comprise a control signal associated with the target action (target output).

In some implementations, the predictor 1110 learning process may be effectuated using a trainable convolutional network framework, e.g., such as described above with respect to FIGS. 5A-5B.

The adaptive predictor 1110 and the combiner 1114 may cooperate to produce a control output 1116 for the robotic device 1130. In one or more implementations, the output 1116 may comprise one or more motor commands (e.g., pan camera to the right, turn right wheel forward, etc.), configure sensor acquisition parameters (e.g., use high resolution camera mode, etc.), and/or other commands. In some implementations, the output 1116 of the combiner 1114 may be coupled to an adapter component 1126. The adapter component 1126 may be configured to transform the output 1116 to output 1128 that may be compatible with the device 1130. The adapter component 1126 may be provided with information for transcoding predictor signal format into robot-specific format 1128. In some implementations, the adapter component 1126 may receive such information from a component 1118 via pathway 1134. In some implementations, the adapter component 1124 and/or adapter component 1126 may be operable to implement transformations illustrated in Table 1 and/or Table 4.

Figure 6:
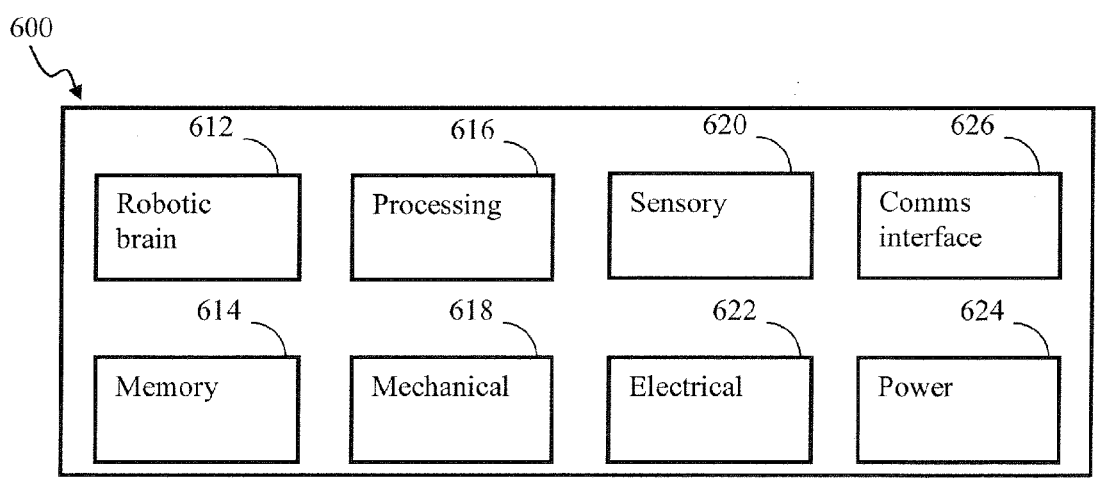
FIG. 6 is a functional block diagram illustrating components of a robotic controller apparatus for use with the trainable convolutional network methodology, in accordance with one or more implementations.

FIG. 6 illustrates a robotic controller apparatus for use with the trainable convolutional network methodology, in accordance with one or more implementations. The robotic controller apparatus 600 may comprise a robotic brain 612 for control of the robotic controller apparatus. The robotic brain may be logically implemented within a processor that executes a computer program embodied as instructions stored in non-transitory computer readable media, and configured for execution by the processor. In other embodiments, the robotic brain may be implemented as dedicated hardware, programmable logic (e.g., field programmable gate arrays (FPGAs), and/or other logical components), application specific integrated circuits (ASICs), and/or other machine implementations. Additional memory 614 and processing capacity 616 is available for other hardware/firmware/software needs of the robotic device. The processing component 616 may interface to the sensory component 620 in order to perform sensory processing e.g., object detection, face tracking, stereo vision, and/or other tasks.

The robotic brain 612 may interface with the mechanical components 618, sensory components 620, electrical components 622, power components 624, and network interface 626 via one or more driver interfaces and/or software abstraction layers. In one or more implementations, the power components 624 may comprise one or more of a direct current, an alternating current source, a mechanical coupling, an energy accumulator (and/or a mechanical energy means (e.g., a flywheel, a wind-up apparatus), a wireless charger, a radioisotope thermoelectric generator, a, a piezo-generator, a dynamo generator, a fuel cell, an internal or external combustion engine, a pneumatic power source, a hydraulic power source, and/or other power sources.

Additional processing and memory capacity (not shown) may be used to support these processes. However, it will be appreciated that the aforementioned components (e.g., mechanical components 618, sensory components 620, electrical components 622, etc.) may be fully controlled by the robotic brain 612. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated within one of more discrete components. For example, robotic brain software may be executed on a server apparatus, and control the mechanical components of a robot via a network or a radio connection. In another such example, multiple mechanical, sensory, and/or electrical units may be controlled by a single robotic brain via network/radio connectivity.

The mechanical components 618 may include virtually any type of component capable of motion (e.g., to move the robotic apparatus 600, manipulate objects external to the robotic apparatus 600, etc.) or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the robotic brain and enable physical interaction and manipulation of the device.

The sensory components 620 allow the robotic device to accept stimulus from external entities. Input stimulus types may include, without limitation: video, audio, haptic, capacitive, radio, accelerometer, ultrasonic, infrared, thermal, radar, lidar, sonar, and/or other sensed inputs.

The electrical components 622 include virtually any electrical component for interaction and manipulation of the external environment. These may include, without limitation: light/radiation generating components (e.g. light emitting diodes (LEDs), infrared (IR) sources, incandescent light sources, etc.), audio components, monitors/displays, switches, heating elements, cooling elements, ultrasound transducers, lasers, and/or other. Such components enable a wide array of potential applications in industry, personal hobbyist, building management, medicine, military/intelligence, and other fields (as discussed below).

The network interface 626 includes one or more connections configured to interact with external computerized devices to allow for, inter alia, management and/or control of the robotic device. The connections may include any of the wireless or wireline interfaces discussed above, and further may include customized or proprietary connections for specific applications.

The power system 624 is configured to support various use scenarios of the device. For example, for a mobile robot, a wireless power solution (e.g. battery, solar cell, inductive (contactless) power source, rectification, and/or other mobile power source) may be appropriate. However, for fixed location applications which consume significant power (e.g., to move heavy loads, and/or other power intensive tasks), a wall power supply (or similar high capacity solution) may be a better fit. In addition, in some implementations, the power system and or power consumption may be configured with the training of the robotic apparatus 600. Thus, the robot may improve its efficiency (e.g., to consider power consumption efficiency) through learned management techniques specifically tailored to the tasks performed by the robotic apparatus.

Figure 9A:
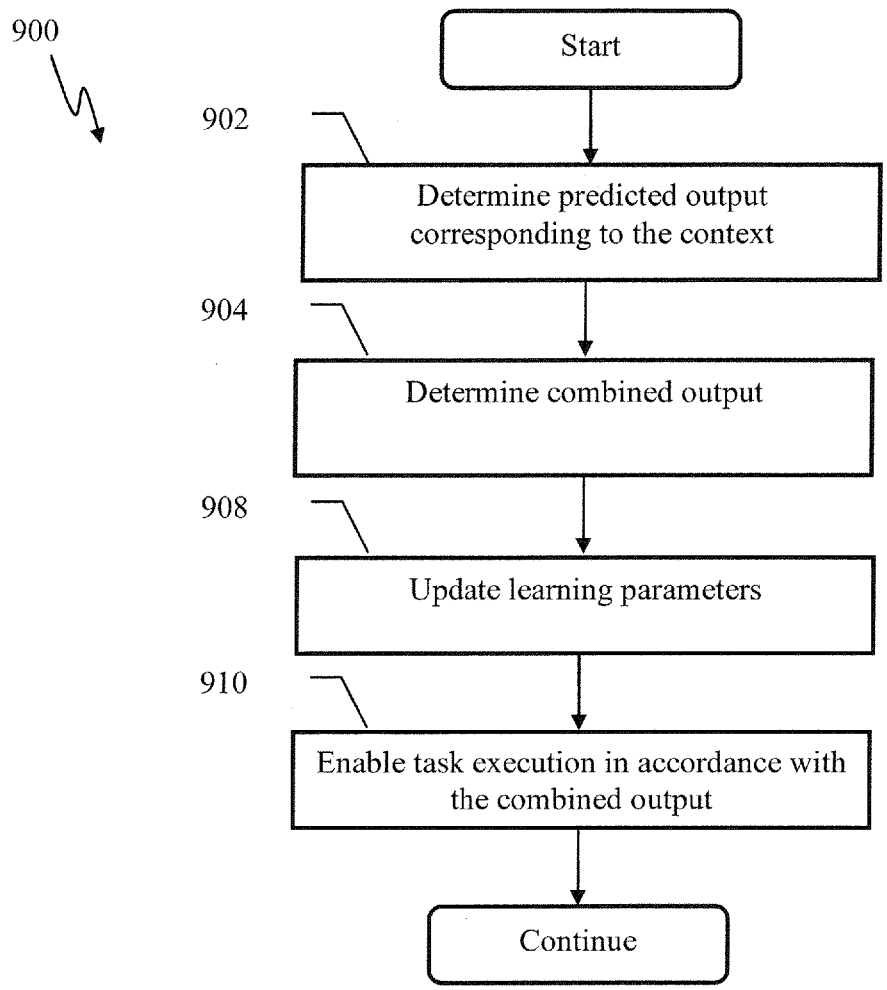
FIG. 9A is a logical flow diagram illustrating operation of a controller comprising a trainable convolutional network apparatus, in accordance with one or more implementations.
Figure 9B:
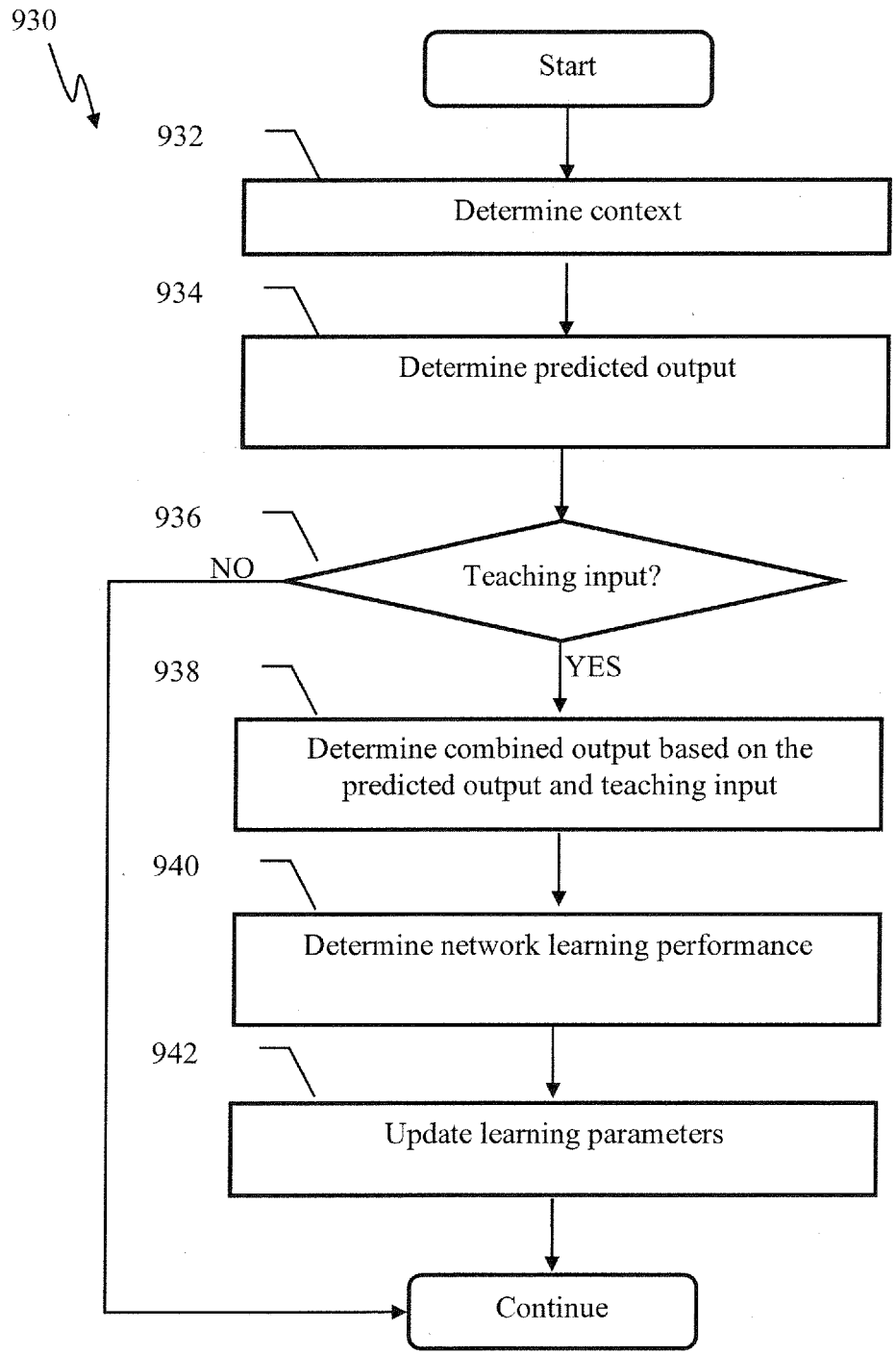
FIG. 9B is a logical flow diagram illustrating determination of control output by a trainable convolutional network apparatus, in accordance with one or more implementations.
Figure 9C:
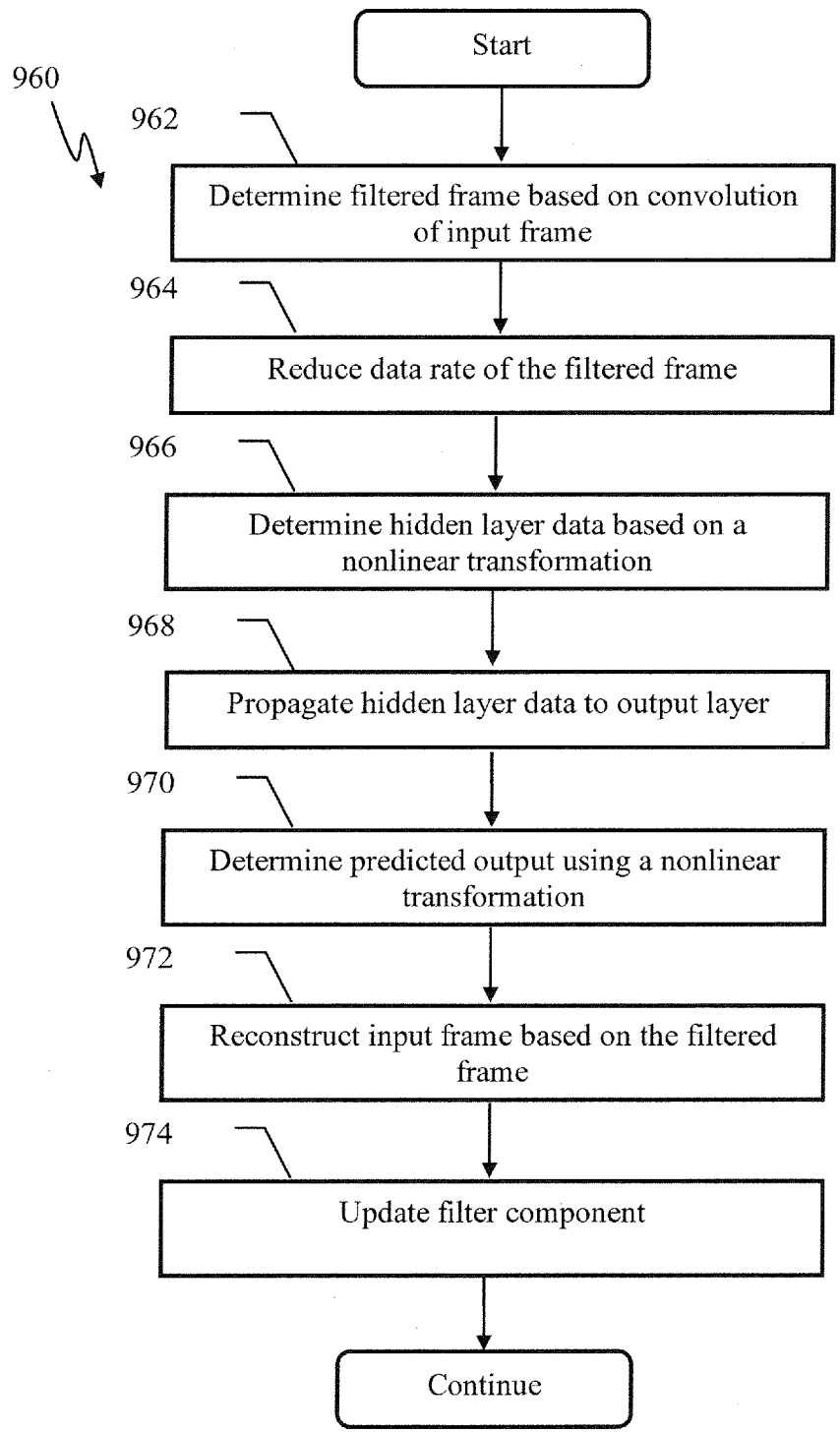
FIG. 9C is a logical flow diagram illustrating operation of a trainable convolutional network apparatus comprising input reconstruction, in accordance with one or more implementations.
Figure 10:
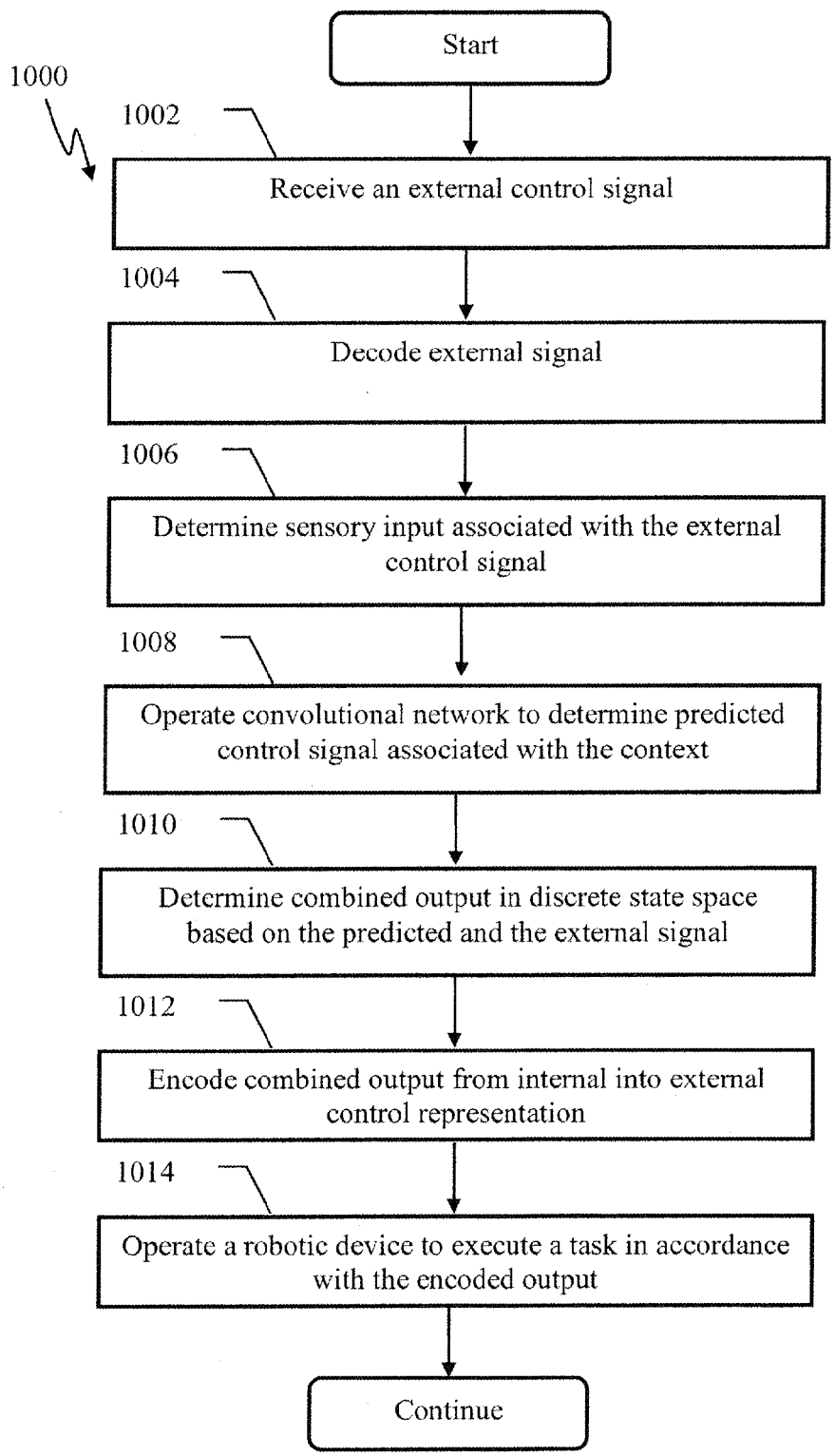
FIG. 10 is a logical flow diagram illustrating an encoding process for control signals useful for determining a control output by an adaptive controller based on a predictor, in accordance with one or more implementations.

FIGS. 9A-10 illustrate several methods of training and operating a learning controller apparatus (comprising trainable convolutional network of the disclosure) in accordance with one or more implementations. The operations of methods 900, 930, 960, 1000 presented below are intended to be illustrative. In some implementations, methods 900, 930, 960, 1000 may be accomplished with one or more additional operations not described, and/or without one or more of the operations discussed. Additionally, the order in which the operations of methods 900, 930, 960, 1000 are illustrated in FIGS. 9A-10 described below is not intended to be limiting.

Methods 900, 930, 960, 1000 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 900, 930, 960, 1000 in response to instructions stored electronically on a non-transitory electronic storage medium. The one or more processing devices may include one or more devices configured through hardware, firmware, and/or software to be specifically designed for execution of one or more of the operations of methods 900, 930, 960, 1000. The operations of methods 900, 930, 960, 1000 may be implemented by a learning controller apparatus (e.g., 400 in FIG. 4) configured to control a robotic device (e.g., 110 in FIG. 1).

FIG. 9A illustrates execution of a target task by a robotic device comprising a trainable convolutional network apparatus, in accordance with one or more implementations. The network may comprise one or more networks described above with respect to FIGS. 4-5B. The robotic device may comprise a robotic vehicle (e.g., 110 of FIG. 1). Operations of method 900 may be executed in order to cause the vehicle to follow a target trajectory (e.g., 330 in FIG. 3B).

At operation 902 of method 900, illustrated in FIG. 9, a predicted output may be determined. In some implementations, the predicted output may be determined based on a context and associations between the context and corresponding actions of the robot for given context. The robot actions may comprise one or more of robot state modifications (e.g., robotic car orientation, speed changes, manipulator joint position, orientation, zoom, focus parameters of a camera, and/or other). In one or more implementations, the associations may be configured based on learning parameter of the learning process of the trainable convolutional network apparatus that may have been adapted during one or more prior occurrences of the context during training.

In one or more implementations, the context may comprise one or more of robot state, including but not limited to e.g., motion parameters (such as position, orientation, speed), platform configuration (e.g., manipulator size and/or position), available power and/or other power considerations, state of the environment (e.g., object size, location), environmental conditions (wind, rain), historic robot motions, and/or other characteristic state information. In some implementations, operation 902 may comprise context determination operation, e.g., such as described below with respect to operation 932 of method 930 (see FIG. 9B).

At operation 904, a combined output may be determined based on the predicted output and a teaching input. In one or more implementations, the teaching input may comprise a corrector output (e.g., 408, 586 in FIGS. 4, 5B, respectively). The combined output may be determined using operations described above with respect to combiner component 414 of FIG. 4 and/or combiner component 584 of FIG. 5B.

At operation 908, the learning parameters of the network may be updated. In one or more implementations. The network update may be configured using a back propagation of a discrepancy between the predicted and the combined output using, e.g., a mean-squared-error, a cross-entropy or negative-log-likelihood operations.

At operation 910, the combined output may be provided to the robotic device thereby enabling the device to execute a task. In one or more implementations, the task execution may comprise following a target trajectory (e.g., 306, 316 in FIG. 3A, and/or trajectory 350 in FIG. 3B).

FIG. 9B illustrates a method of determining a control output by a trainable convolutional network apparatus, in accordance with one or more implementations.

At operation 932, of method 930, illustrated in FIG. 9A, a context may be determined. In one or more implementations, the context may comprise one or more of robot state, including but not limited to e.g., motion parameters (such as position, orientation, speed), platform configuration (e.g., manipulator size and/or position), available power and/or other power considerations, state of the environment (e.g., object size, location), environmental conditions (wind, rain), historic robot motions, and/or other characteristic state information.

For example, the context may correspond to presence, shape, location of an object relative to the robot trajectory as illustrated in FIG. 3A. In one or more implementations, such as object recognition, feature detection and/or navigation, the context may be determined based on an input may be provided by a sensor module (e.g., the camera 116 in FIG. 1). The input may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active pixel sensor (APS), and/or other sensor types. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK (cyan, magenta, yellow, and key), HSV (hue, saturation, value), HSL (hue, saturation, lightness), grayscale, and/or other representations) and/or moving picture formats (e.g., video) are equally useful with the present disclosure. In one or more implementations, the sensory aspects may include an object being detected in the input, a location of the object, an object characteristic (color/shape), a characteristic of robot's movements (e.g., speed along the trajectory portion 304 in FIG. 3), a characteristic of an environment (e.g., an apparent motion of a wall and/or other surroundings, physical characteristics of an "approach" (e.g., incline, texture, etc.), and/or other environmental characteristics) responsive to the movement. Context determination may comprise determination of hidden layer output (e.g., 506, 552 in FIGS. 5A-5B).

At operation 934, a predicted output may be determined. In some implementations, the predicted output may be determined based on the context obtained at operation 932 and associations between the context and corresponding actions of the robot for given context.

At operation 936, a determination may be made as to whether a teaching input may be present. In some implementations, the teaching input may comprise an external (with respect to the trainable network) input provided by a trainer (e.g., the input 1122 in FIG. 11 and/or 586 in FIG. 5B). The teaching input may be configured to aid generation of a control output by the network in order to cause a robotic device (e.g., 110 in FIG. 1) to execute a target task. In some implementations, the trainer may comprise a user and/or a computerized agent that had been trained to operate the robotic device.

Responsive to a determination at operation 936 that the teaching input is present, the method 930 may proceed to operation 938 wherein combined output may be determined based on the predicted output and the teaching input. In one or more implementations, the combined output may be determined using operations described above with respect to combiner component 414 of FIG. 4 and/or combiner component 584 of FIG. 5B.

At operation 940, network learning performance may be determined. In one or more implementations, the learning performance may comprise a cost measure obtained using any applicable methodology (e.g., such as described in co-owned U.S. patent application Ser. No. 13/487,499 entitled "STOCHASTIC APPARATUS AND METHODS FOR IMPLEMENTING GENERALIZED LEARNING RULES", filed Jun. 4, 2012 and issued as U.S. Pat. No. 9,104,186 on Aug. 11, 2015, incorporated supra). In some implementations, the performance may comprise determination of a discrepancy between the predicted output and the combined output, using, e.g., a mean-squared-error, a cross-entropy, and/or negative-log-likelihood operations.

At operation 942, learning parameters of the network may be updated based on the performance measure. The network update may be configured based on online error back propagation methodology, e.g., described in co-owned and co-pending U.S. patent application Ser. No. 14/054,366 entitled "APPARATUS AND METHODS FOR BACKWARD PROPAGATION OF ERRORS IN A SPIKING NEURON NETWORK", filed Oct. 15, 2013, incorporated supra and/or co-owned U.S. patent application Ser. No. 13/487,499 entitled "STOCHASTIC APPARATUS AND METHODS FOR IMPLEMENTING GENERALIZED LEARNING RULES", filed Jun. 4, 2012, issued as U.S. Pat. No. 9,104,186 on Aug. 11, 2015, incorporated supra.

FIG. 9C illustrates a method of operation of a trainable convolutional network apparatus comprising input reconstruction, in accordance with one or more implementations.

At operation 962, a filtered data frame may be determined based on a convolution of an input data frame and a filter of a filter bank. In one or more implementations, the frame may comprise one or more channels (e.g., of an RGB frame) and the convolution operation may be described by Eqn. 10.

At operation 964, the data rate of the filtered data frame may be reduced. In one or more implementations, the data rate reduction may be effectuated based on a frame partition operation, e.g., as described with respect to component 504 of FIG. 5A.

At operation 966, hidden layer data may be determined based on a nonlinear transformation of the reduced rate data. In one or more implementations, the hidden layer data may be determined using methodology of Eqn. 12-Eqn. 13, described above with respect to FIGS. 5A-5B.

At operation 968, hidden layer data may be propagated to output layer. In some implementations, the hidden layer data propagation may be effectuated using a connectivity array of weights between hidden layer and output layer (e.g., as expressed by Eqn. 14)

At operation 970, the predicted output may be determined using a nonlinear transformation applied to output of the output layer of the network. In some implementations, the predicted output determination may be effectuated using Eqn. 15-Eqn. 16

At operation 972, the input data frame may be reconstructed based on the filtered frame (e.g., the frame obtained at operation 962). In one or more implementations, the reconstruction may comprise a convolution of the filtered frame with a respective filter of reconstruction filter bank.

At operation 974, the filter components may be updated. The update may be based on a performance measure (e.g., a reconstruction cost described above with respect to FIG. 5B) determined using a comparison of the input frame and reconstructed frame. In some implementations, the filter component update may comprise updating input processing filters (e.g., the component 544 in FIG. 5B and/or reconstruction filters 566 in FIG. 5B).

FIG. 10 illustrates a method of communicating control signals used for determining a control output by an adaptive controller comprising a predictor, in accordance with one or more implementations. Operations of method 1000 may be employed by the system 1100 of FIG. 11 and/or a trainable convolutional network apparatus 540 of FIG. 5B configured to operate a robotic device (e.g., the vehicle 110 of FIG. 1).

At operation 1002, an external control signal may be received. In some implementations, the external control signal may comprise a continuous representation signal (e.g., voltage, engine RPM, current, torque, power, trim angle, and or other parameter associated with one or more actuators of the vehicle). In some implementations, the external control signal may comprise a signal characterized by a number of channels. By way of an illustration of a vehicle comprising two actuators, the multi-channel signal may be configured to convey control for left/right wheel motors actuators (e.g., {1,1} may correspond to forward motion command, {−1, −1} may correspond to reverse motion command). In some implementations, the multichannel signal may be described using representation shown in Table 4 above.

At operation 1004, the external signal may be decoded. In some implementations of continuous external control signals, the encoding may comprise determining a state within a discrete state space, e.g., as described above with respect to FIG. 8 and/or Table 1. In some implementations the decoder may be configured to rescale the drive and/or steering signals to a range appropriate for the motors and/or actuators of the vehicle. In some implementations of multichannel external control signals, the encoding may comprise determination of a control vector and/or a multi-bit parameter using, e.g., representation of Table 4.

At operation 1006, sensory input associated with the external control signal may be determined. In some implementations, the sensory input determination may comprise determining hidden layer output of network, e.g., as described above with respect to FIGS. 5A-5B, 11 and/or methods 930, 960.

At operation 1008, a convolutional network may be operated to determine predicted control signal associated with the context. In some implementations, the predicted control signal determination may comprise coupling of the hidden layer output to the output layer and/or determination of the network output layer response, e.g., as described above with respect to FIGS. 5A-5B, 11 and/or methods 930, 960.

At operation 1010, a combined output in discrete state space may be determined based on the predicted and the external control signals. In one or more implementations, the combined signal determination may be effectuated by a combiner component, e.g., 414, 584, 1114 as described above with respect to FIGS. 5A-5B, 11.

At operation 1012, the combined output may be encoded from an internal network representation into an external control representation. In one or more implementations, the encoding may be effectuated using, e.g., components 424, 1126 of FIGS. 4, 11 and/or representation described above with respect to Table 1 and Table 4.

At operation 1014 the robotic device may be operated to execute a task in accordance with the encoded combined output. In one or more implementations, the robotic device operation may comprise navigating a target trajectory (e.g., 306, 316 in FIG. 3A, and/or 330 in FIG. 3B).

Figure 12:
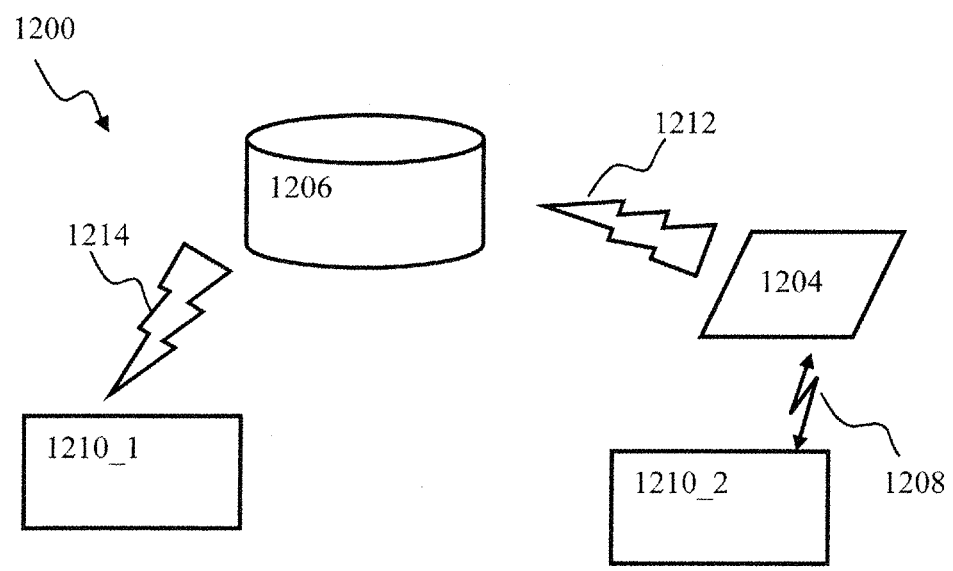
FIG. 12 is a functional block diagram illustrating a computerized system comprising the learning controller apparatuses of the present disclosure, in accordance with one implementation.

FIG. 12 illustrates a computerized system comprising a learning controller apparatus of the disclosure, in accordance with one implementation. The system 1200 may comprise a computerized entity 1206 configured to communicate with one or more learning controllers 1210 (e.g., 1210_1, 1210_2). In some implementations, the entity 1206 may comprise a computing cloud entity (e.g., a cloud service, a server, in a public, private or hybrid network). In one or more implementations, the entity may comprise a computer server, a desktop, and/or another computing platform that may be accessible to a user of the controller 1210. In some implementations of the cloud computing services, one or more learning controller apparatus 1210 may communicate with the entity 1206 in order to access computing resources (e.g., processing cycles and/or memory) in order to, e.g., operate trainable convolutional network of, e.g., FIGS. 4-5B. In some implementations, the learning controller apparatus 1210 may communicate with the entity 1206 in order to save, load, and/or update, their processing configuration (e.g., robotic brain 612 in FIG. 6). The robotic brain images may comprise executable code (e.g., binary image files), bytecode, an array of weights for an artificial neuron network (ANN), and/or other computer formats. In some implementations, the learning controller apparatus 1210 may communicate with the entity 1206 in order to save, and/or retrieve learned associations between sensory context and actions of a robot, e.g., configuration of trained network.

In FIG. 12, one or more learning controller apparatus (e.g., 1210_1) may connect to the entity 1206 via a remote link 1214, e.g., Wi-Fi, and/or cellular data network. In some implementations, one or more learning controller apparatus (e.g., 1210_2) may connect to the entity 1206 via a local computerized interface device 1204 using a local link 1208. In one or more implementations, the local link 1208 may comprise a network (Ethernet), wireless link (e.g. Wi-Fi, Bluetooth, infrared, radio), serial bus link (USB, Firewire,) and/or other. The local computerized interface device 1204 may communicate with the cloud server entity 1206 via link 1212. In one or more implementations, links 1212 and/or 1214 may comprise an internet connection, and/or other network connection effectuated via any of the applicable wired and/or wireless technologies (e.g., Ethernet, Wi-Fi, LTE, CDMA, GSM, etc.)

In one or more applications that may require computational power in excess of that that may be provided by a processing module of the learning controller 1210_2, the local computerized interface device 1204 may be used to perform computations associated with training and/or operation of the robotic body coupled to the learning controller 1210_2. The local computerized interface device 1204 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware. The methodology described herein may advantageously enable operation of robotic devices by a trained controller. A robotic vehicle may be operated by a learning controller comprising a trainable convolutional network configured to determine control signal based on sensory input. During training, efficacy of network connections may be adapted using a measure determined based on a target output provided by a trainer and an output predicted by the network. A combination of the predicted and the target output may be provided to the vehicle to execute a task. The network adaptation may be configured using an error back propagation method. The network may comprise an input reconstruction.

Use of convolutional network for detecting features in video images obtained by a video camera disposed on a robotic car may enable detection of a given object (e.g., a ball) at a variety of locations within the image. Sharing of weights by a given filter sampling different locations within the image may provide for faster learning thereby improving user experience. Convolutional networks approach may enable a user to train the controller to detect a variety of objects without object pre-selection and/or network pre-wiring. Weight sharing between different portions of the image may provide for smaller, lower cost and/or more energy efficient network processing electronics. These improvements may be leveraged for constructing autonomous robotic vehicles characterized by a lower cost and/or increased autonomy and/or enable robotic devices to operate in more complex requirements (e.g., tracking multiple targets), navigate at higher speeds, and/or achieve higher performance (e.g., as characterized by a number of collisions, run time and/or other parameter).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A method of operating a robotic device by a computerized neuron network comprising an input layer, an intermediate layer and an output layer of neurons, the method comprising:

during one operation of a plurality of operations:
causing the robotic device to execute an action along a first trajectory in accordance with a first control signal determined based on a sensory input;
determining, by the output layer, a performance measure based on an evaluation of the first trajectory and indication related to a target trajectory provided by a trainer;
conveying information related to the performance measure to the input layer; and
updating one or more learning parameters of the input layer in accordance with the information; and during a subsequent operation of a plurality of operations:
causing the robotic device to execute the action along a second trajectory in accordance with a second control signal determined based on the sensory input;
wherein:
the execution of the action along the second trajectory is characterized by a second performance measure; and
the updating is configured to displace the second trajectory closer towards the target trajectory relative to the first trajectory.

2. The method of claim 1, wherein:
the first control signal is based on a feature detected in the sensory input;
one or more first nodes of the input layer process are configured to effectuate the detection of the feature; and
the updating is configured to modify one or more parameters associated with the one or more first nodes of the input layer.

3. The method of claim 2, wherein:
one or more second nodes of the output layer are configured to produce the first control signal;
the one or more first nodes of the input layer are coupled to the one or more second nodes of the output layer via a connectivity array of efficacies; and
the updating comprises a plasticity operation configured to modify one or more efficacies of the connectivity array of efficacies.

4. The method of claim 3, wherein:
the one or more first nodes of the input layer are coupled to the one or more second nodes of the output layer via an an-all to all connectivity pattern; and
the connectivity array of efficacies is characterized by a first dimension determined based on a first number of the one or more first nodes of the input layer and a second dimension determined based on a second number of the one or more second nodes of the output layer.

5. The method of claim 1, wherein:
the performance measure comprises a first distance between the first trajectory and the target trajectory; and
the second performance measure comprises a second distance between the second trajectory and the target trajectory, the second distance being smaller than the first distance.

6. The method of claim 1, wherein:
the performance measure comprises a first probability parameter between the first trajectory and the target trajectory; and
the second performance measure comprises a second probability between the second trajectory and the target trajectory, the second probability being greater than the first probability.

7. The method of claim 1, wherein:
the computerized neuron network is configured for operation in accordance with a supervised learning process configured based on a teaching signal; and
the first control signal comprises a combination of the second layer output and a teaching signal provided to the robotic device.

8. A method of generating a predicted control output by an adaptive controller of a robotic apparatus comprising a predictor and a combiner, the method comprising:
configuring the adaptive controller apparatus to detect an object in sensory input provided by a sensor of the robotic apparatus, the object detection causing generation of a control output based on a characteristic of the object;
configuring the predictor to determine a predicted control output based on the characteristic of the object;
configuring the combiner to determine a combined output based on a control input and the predicted control output, the combined output being characterized by a transform function;
determining a performance measure based on the predicted control output and the combined output;

updating one or more learning parameters of the adaptive controller in accordance with the performance measure; and configuring the adaptive controller to provide the combined output to the robotic apparatus, the combined output configured to cause the robotic apparatus to execute a maneuver in accordance with the characteristic of the object.

9. The method of claim 8, wherein:
the object detection is effectuated by a first component of the adaptive controller; and
the generation of the control output is effectuated by a second component of the adaptive controller;
the one or more learning parameters update uses a back propagation operation configured to convey the performance measure from the second component to the first component.

10. The method of claim 9, further comprising providing the control input by a training entity based on an evaluation of a trajectory associated with the maneuver executed by the robotic apparatus versus a target trajectory.

11. The method of claim 10, wherein the transform function is configured to combine the predicted control output and the control input via one or more operations including a union operation.

12. The method of claim 10, wherein the transform function is configured to combine the predicted control output and the control input via one or more operations including an additive operation.

13. The method of claim 10, wherein:
the training entity comprises a computerized apparatus operable in accordance with a reinforcement learning process; and
the predictor is operable in accordance with a supervised learning process configured based on a teaching signal configured based on the combined output.

14. The method of claim 9, wherein:
the robotic apparatus comprises a vehicle;
the sensory input comprises a video stream of vehicle surroundings;
the characteristic of the object comprises a representation of an obstacle or a target within the vehicle surroundings; and
the maneuver comprises one of an obstacle avoidance or a target approach.

15. A method of operating a robotic device using a computerized neuron network having a plurality of layers of neurons, the method comprising:
causing the robotic device to execute an action along a first trajectory in accordance with a first control signal, the first signal determined based at least on a sensory input;
determining a performance measure based on an evaluation of the first trajectory relative to a target trajectory;
updating one or more learning parameters of a first of the plurality of layers in accordance with information relating to the determined performance measure; and
causing the robotic device to execute the action along a second trajectory in accordance with a second control signal, the second signal determined based at least on a sensory input and the updated one or more learning parameters, the second trajectory being closer to the target trajectory than the first trajectory.

16. A computerized neuron network apparatus configured to provide a response based on analysis of visual input frames, the computerized neuron network apparatus comprising:
an input component comprising first portion of neurons configured to implement a convolutional operation on the visual input frames using a plurality of filter masks, the operation being configured to produce convolved input frames;
an output component comprising at least one output neuron configured to provide an output based on the at least one output neuron reaching a target state;
a connection component configured to couple the input component to the at least one output neuron via an efficacy array; and
a cost estimation component configured to determine a first similarity measure between a given response and a target response;
wherein:
the given response is configured based on the output;
the first similarity measure determined based on a first analysis of a first frame of the visual input frames is configured to cause an update of the neuron network, the update of the neuron network being configured to increase a second similarity measure determined based on a second analysis of a second frame of the visual input frames subsequent to the first frame;
the convolved input frames are configured to enable detection of an object;
the output is configured based on the detected object; and
the given response is configured to be provided to the computerized neuron network apparatus, the given response being configured to cause the computerized neuron network apparatus to execute a first action in accordance with the detected object.

17. The computerized neuron network apparatus of claim 16, wherein the update comprises:
determination of a discrepancy parameter based on the first similarity measure;
modification of one or more efficacies of the efficacy array using the discrepancy parameter;
backward propagation of the discrepancy parameter from the output component to the input component using a gradient operation with respect to a filter mask parameter; and
modification of the filter mask parameter based on an outcome of the gradient operation.

18. The computerized neuron network apparatus of claim 17, further comprising:
an input reconstruction component configured to produce reconstructed input frames based on the convolved input frames and a de-convolution filter mask;
wherein the update further comprises:
a second modification of the filter mask parameter based on an evaluation of the convolved input frames and a first reconstructed input frame, the second modification being configured to reduce the discrepancy for another response generated based on a third frame subsequent to the second frame.

19. The computerized neuron network apparatus of claim 18, wherein:
a first response generated in an absence of input reconstruction is characterized by a first value of the second similarity measure;
a second response generated based on the input reconstruction is characterized by a second value of the second similarity measure, the second value being greater than the first value.

20. The computerized neuron network apparatus of claim 19, wherein the computerized neuron network apparatus is configured to determine that the given response is closer to the target response based at least on the second value being greater than the first value.

21. The computerized neuron network apparatus of claim 20, further comprising a combiner component configured to determine a combined output based at least on the output and a correction signal, the combined output being characterized by a transform function;
   wherein the determination of the first similarity measure is configured based on the output and the combined output.

22. The computerized neuron network apparatus of claim 21, wherein the first action is selected from the group comprising: object avoidance actions and object approach actions.

* * * * *